United States Patent [19]

Murtha et al.

[11] 4,166,289
[45] Aug. 28, 1979

[54] STORAGE CONTROLLER FOR A DIGITAL SIGNAL PROCESSING SYSTEM

[75] Inventors: John C. Murtha, Towson; James A. Ross, Jr., Aberdeen; William G. Shipley, Old Mill; Martin W. Czekalski, Millersville, all of Md.

[73] Assignee: Westinghouse Electric Corp., Pittsburgh, Pa.

[21] Appl. No.: 832,775

[22] Filed: Sep. 13, 1977

[51] Int. Cl.² .......................... G06F 3/04; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,438,003 | 4/1969 | Bryan | 364/900 |
| 3,573,851 | 4/1971 | Watson et al. | 364/200 |
| 3,573,853 | 4/1971 | Watson et al. | 364/200 |
| 3,787,673 | 1/1974 | Watson et al. | 364/200 X |

*Primary Examiner*—Harvey E. Springborn
*Attorney, Agent, or Firm*—R. M. Trepp

[57] ABSTRACT

A storage controller for independently controlling the transfer of vectors of data into and out of a memory from a plurality of input devices and a digital signal processor capable of performing complex arithmetic functions. Program instructions, stored in the memory of the storage controller, specify the sequence of vector transfer between each device and the memory. The storage controller recognizes a request for a transfer of a vector of data from each device and selects one for a vector transfer according to predetermined priorities. The storage controller, under program control, repeats the execution of each program instruction word a predetermined number of times, generating upon each repeated execution a new address in the memory, whereby a vector of data is transferred between the memory and the selected device or vice versa. Each address generated by the storage controller during a vector transfer may be a certain increment from the preceding address generated whereby vectors of data may be stored in predetermined address locations in the memory and transferred out of the memory from different address locations.

15 Claims, 20 Drawing Figures

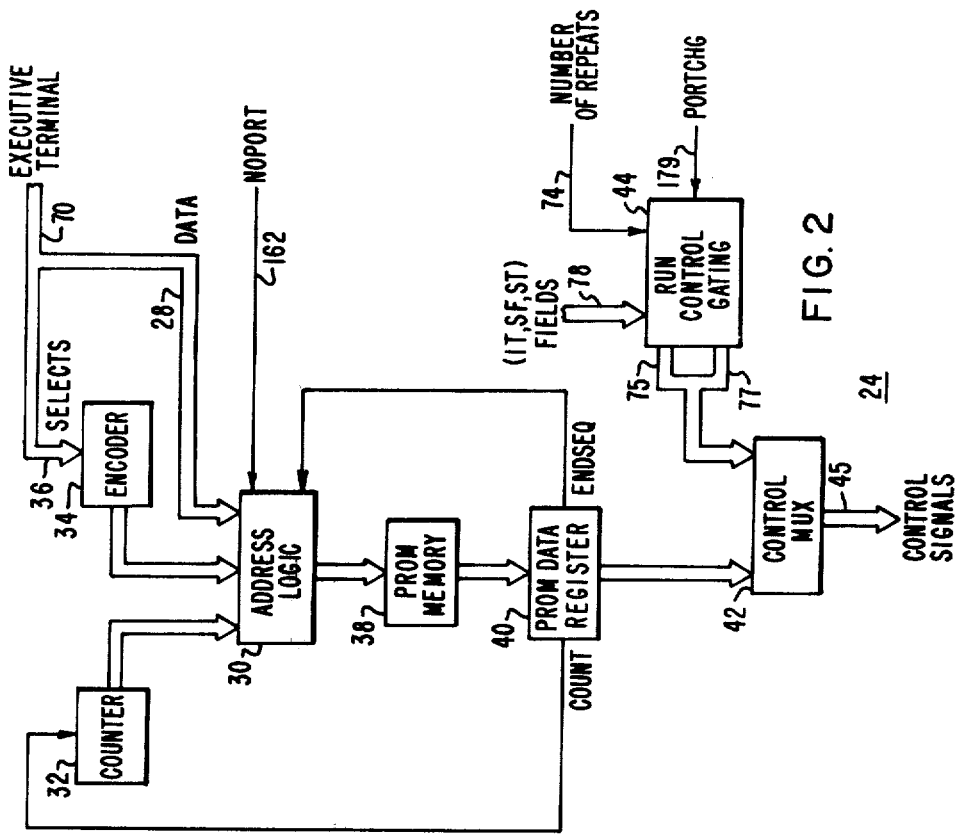
FIG. 2
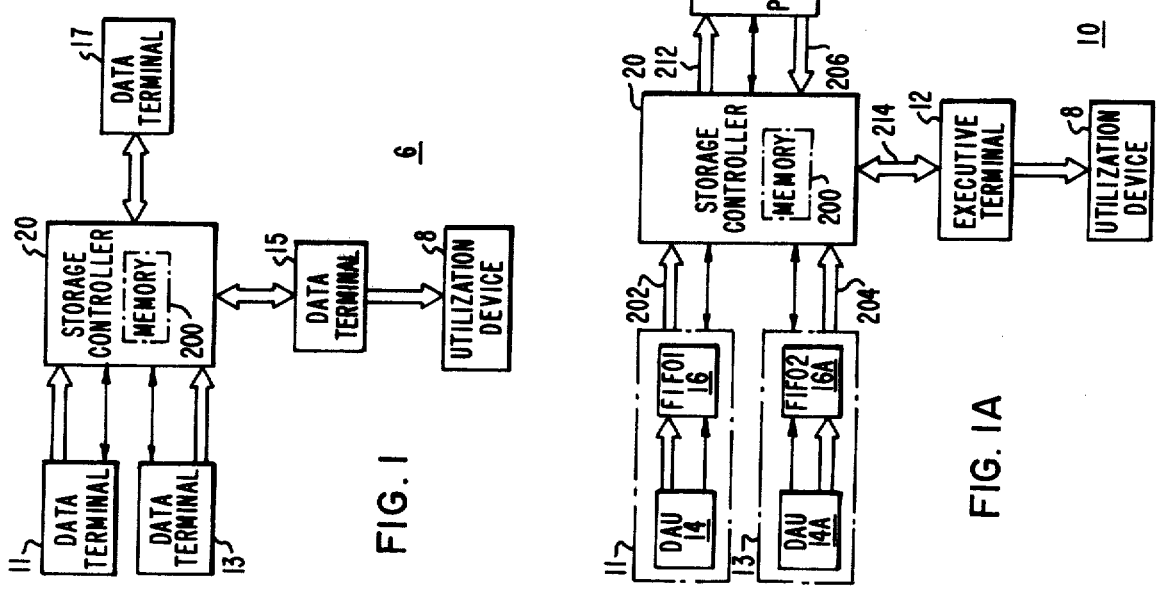
FIG. 1
FIG. 1A

STORAGE CONTROLLER FOR A DIGITAL SIGNAL PROCESSING SYSTEM

CROSS-REFERENCE TO RELATED APPLICATION

Certain of the subject matter disclosed but not claimed herein is set forth and claimed in copending application Ser. No. 832,853, filed Sept. 13, 1977, in the name of J. Murtha, J. Ross, W. Price, C. Adams and K. Lucas and assigned to the assignee of the present application.

BACKGROUND OF THE INVENTION

1. Field of the Invention

This invention relates, in general, to digital signal processing systems and, more specifically, to storage controllers which control the transfer of data in a digital signal processing system comprising at least a memory device, a plurality of input/output devices and a digital signal processor.

2. Description of the Prior Art

In signal processing systems, special purpose digital signal processors have been used to process digital data such as a series of data words obtained by sampling an analog signal and converting the sample with an analog to digital converter to a digital word. In such systems, the digital signal processor performs complex arithmetic computations, such as a Fast Fourier Transform (FFT), on blocks or vectors of digital data words obtained from the analog signals for use in frequency spectrum analysis and filtering applications. One such digital signal processor is disclosed in U.S. Pat. No. 3,812,470, issued to J. Murtha and J. Ross and assigned to the assignee of the present invention. The digital signal processor disclosed therein is efficiently designed to perform a Fast Fourier Transform on a block of data words. As is generally known, each stage of a N-point FFT involves several complex additions and multiplications in order to generate both the real and imaginary coefficients of the transform. Thus, it is apparent that as the number of data points sampled increase so must the number of operations to be performed by the digital signal processor. When large data sets are to be processed, the throughput of the special purpose digital signal processor is greatly decreased since the processor must store and handle all of the data transfers and further must generate the complex strings of memory addresses needed to formulate the data so as to efficiently compute the transform.

A typical prior art approach to improve the throughput of a processor utilizes a so-called input-output controller which independently handles the transfer of data between a central processing unit, for example, and a number of input-output devices thereby relieving the central processor of the time consuming task of communicating with each device. One such system is disclosed in U.S. Pat. No. 3,740,728, issued to Pullen, in which the central processor initiates a data transfer by sending to the input-output controller the first word in memory of the data transfer, the number of data words to be transferred, the specific input-output device involved and the direction of data transfer. The input-output controller then completely controls the data transfer by generating a consecutive sequence of memory addresses, transfers the data, word by word, between the input-output device and each address location in memory and finally tells the central processor when the data transfer is finished.

In a similar system, disclosed in U.S. Pat. No. 3,413,716, issued to Bahrs, a memory controller coordinates access to a memory by recognizing requests for data transfer from both a central processing unit and a plurality of input-output controllers according to a predetermined priority scheme. Each input-output controller independently controls the transfer of data between the memory controller and a plurality of input-output devices connected thereto.

Such input-output controllers greatly increase the throughput of a central processing unit by relieving the central processor of the time consuming task of controlling each data transfer with input-output devices which are generally slow electromechanical devices. However, such systems provide no capability for generating the complex, non-sequential strings of memory addresses necessary to formulate the data so as to efficiently perform complex arithmetic functions, such as a Fast Fourier Transform, since such input-output controllers known in the prior art merely transfer blocks of data between consecutive address locations in the memory.

Thus, it is desirable to provide a controller for a digital signal processing system which is capable of independently initiating and controlling the transfer of vectors or blocks of data between a digital signal processor and a plurality of input-output devices. It is also desirable to provide a controller which has the capability to generate complex, non-sequential strings of memory addresses useful in performing complex arithmetic functions, such as a Fast Fourier Transform. In addition, it is desirable to provide a controller which is able to recognize requests for data transfer from each device and further is able to initiate transfer of vectors of data according to a predetermined priority scheme in order to maximize the overall system processing capability.

SUMMARY OF THE INVENTION

Herein disclosed is a novel storage controller which independently initiates and controls the transfer of vectors of data from input devices into a memory and further between the memory and a processor, such as a digital signal processor, programmed to perform complex arithmetic computations, such as a Fast Fourier Transform, on vectors of data. Program instruction words are stored in the memory of the storage controller and specify the sequence of vector transfer between the memory of the storage controller and each input device or digital signal processor. The storage controller completely controls access to the memory by selecting one of the input devices or the digital signal processor for a vector transfer with the memory based on a request by the device for a vector transfer and the preassigned priority of the various devices.

A unique hardware and program instruction word configuration enables the storage controller to repeatedly execute each of the program instruction words a predetermined number of times and to generate, in response to each repeated execution of a program instruction word, an address location in the memory used in the transferring of each data word of the vector of data words between the memory and the particular input device or the digital signal processor. In addition, during each repeated execution of a program instruction word, the storage controller, under program control, may increment the address generated during the preceding execution of the instruction word by a predetermined amount thereby enabling successive data words to be stored in non-incremental locations in the memory. This is useful in transferring data to the memory sice the access time involved in a memory operation is reduced which thereby increases the data rate of the system. Furthermore, a vector, to be transferred between the memory and the digital signal processor, may be formed of data words stored at different non-sequential address locations in the memory such that the data is in a form that is readily used by the digital signal processor to perform a complex arithmetic function, such as the Fast Fourier Transform. The selected arrangement of data words greatly reduces the number of operations to be performed by the digital signal processor in handling the vector of data and therefore improves the processing capability of the digital signal processor.

By controlling access to memory through combination of requests and priorities, the storage controller increases the signal processing capabilities of the digital signal processing system over the prior art systems since each device may acquire and process data at its own individual rate and is not connected directly to the other data devices for transfers of data.

BRIEF DESCRIPTION OF THE DRAWING

The various features, advantages, and other uses of this invention will become more apparent by referring to the following detailed description and drawing, in which:

FIG. 1 is a block diagram of a digital signal processing system utilizing a storage controller constructed according to the teachings of this invention, FIG. 1A is a block diagram of another embodiment of a digital signal processing system constructed according to the teachings of this invention, FIG. 2 is a block diagram of the control logic circuitry of the storage controller shown in FIG. 1.

DESCRIPTION OF THE PREFERRED EMBODIMENT

Figure 3:
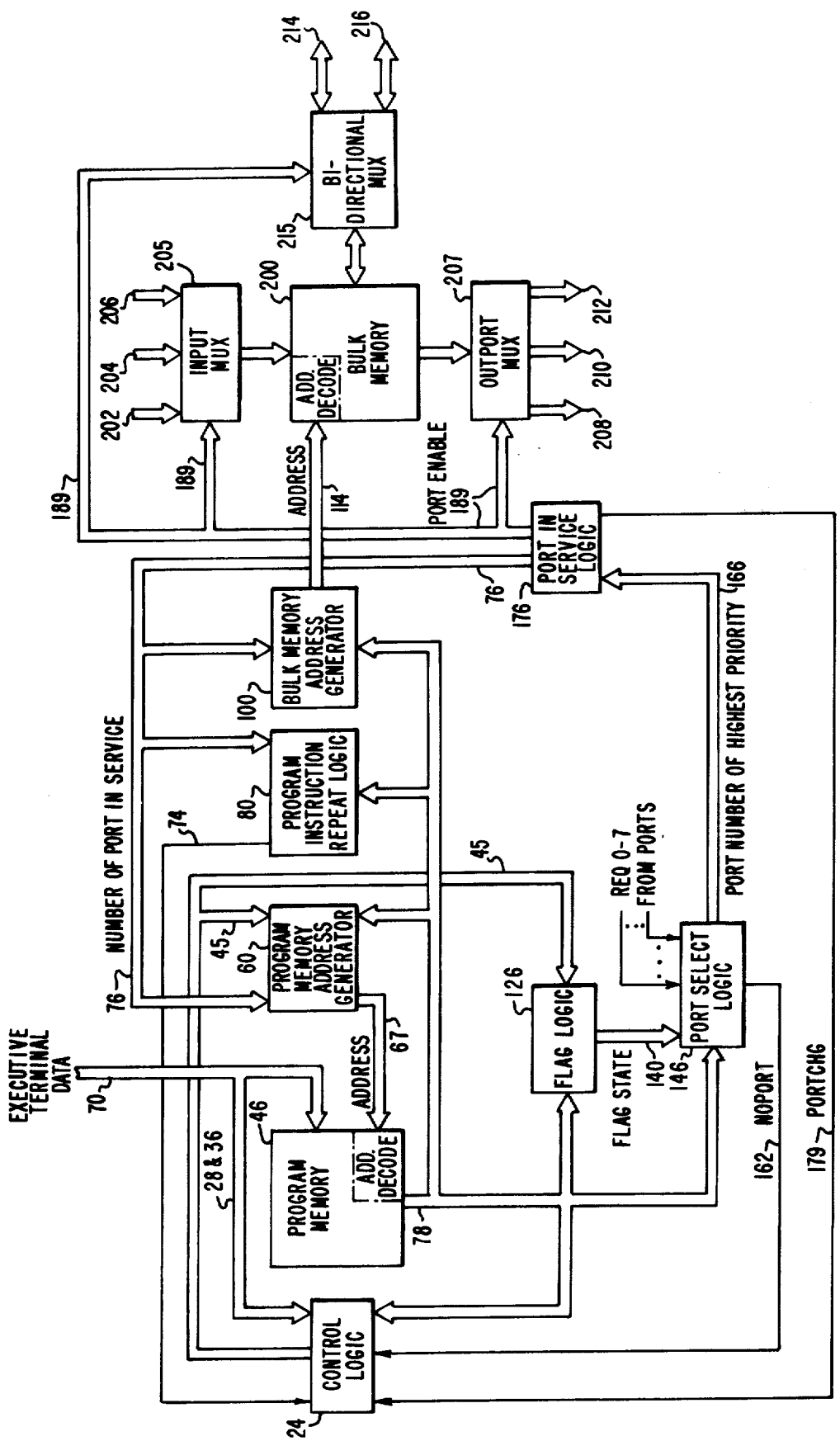
FIG. 3 is a block diagram of a storage controller constructed according to the teachings of this invention.

Before beginning with a detailed description of the storage controller of the present invention, a few words are appropriate concerning the manner in which the storage controller will be described. It is to be expressly understood that in the description which follows, some of the control circuitry has been omitted for the purposes of brevity and clarity but that these additional circuits would obviously be present in a complete system. However, inasmuch as the generation, use and interrelationship of these control signals does not, per se, form a part of the present invention, and inasmuch as the use and construction of these control circuits is commonly known to those skilled in the art, they are not herein included. Furthermore, the same component, shown in multiple figures of the drawing, is identified by identical reference numbers in all of the figures of the drawing.

In order to better understand the uses and advantages of this invention, a general description of a digital signal processing system will first be presented. Typically, digital signal processing systems, such as the digital signal processing system 6 shown in FIG. 1, process the video output of radar systems in order to improve the accuracy of the target detection capabilities of the radar systems. In such an application, data terminal 17 includes a digital signal processor, such as one disclosed in U.S. Pat. No. 3,812,470, issued to J. Murtha and J. Ross and assigned to the assignee of the present invention, which performs complex arithmetic computations, such as a Fast Fourier Transform (FFT), on large blocks or strings of data received from other data terminals, such as terminals 11 and 13, in order to transform the data into a usable form for frequency spectrum analysis and filtering applications. In order to improve the capabilities of such a digital signal processor, a novel storage controller is utilized to independently handle all data transfers in the signal processing system and, further, to generate complex sequences of memory addresses which present the data to the signal processor in a more usable form, thereby permitting the signal processor to efficiently carry out the complex arithmetic computations.

Throughout the following description and claims, the term "vector of data words" is used to describe a number of data words that are transferred between the components of a digital signal processing system. This is to be interpreted as an N-dimensional array of data words in which each data word is transferred to or from an address location in memory which is a predetermined number, either consecutive or non-consecutive, of address locations from the address location associated with the preceding data word of the vector. Thus, a vector of data words is a more general form of a block of data words which are typically associated with consecutive address locations in a memory. However, a vector, as defined above, could be formed of a series or block of data words stored at consecutive address locations or could even include a single data word.

FIG. 1 shows a digital signal processing system 6 containing a storage controller 20 constructed according to the teachings of this invention.

The storage controller 20 initiates and controls the transfer of data words between a plurality of data terminals, such as data terminals 11, 13 and 17, and a memory 200 contained within the storage controller 20. The data terminals may be any suitable type of data device such as a data acquisition unit, input terminal, general purpose computer or a special purpose digital signal processor. In addition, one of the data terminals, such as data terminal 15, may be utilized to initiate the operation of the storage controller 20 as well as loading initial values and program words into the storage controller 20. The data terminal 15 may also communicate with a utilization device 8 which could include a general purpose computer connected in a hierarchial computer system or even another storage controller.

Referring now to FIG. 1A, there is shown another digital signal processing system 10 including a storage controller 20 constructed according to the teachings of this invention. Digital signal processing system 10 includes data terminals 11 and 13, each consisting of a data acquisition unit, such as DAU 14 in data terminal 11, which provides digitized data signals representative of the analog video signals from a radar system to a FIFO register, such as FIFO1 register 16. Data terminal 18, meanwhile, is a special purpose digital signal processor adapted to perform complex arithmetic functions, such as a Fast Fourier Transform, hereafter FFT, on vectors of data words. The storage controller 20 controls all of the transfers of data between the various components of the digital signal processing system 10, such as between FIFO 16 and the digital signal processor 18. Data terminal 12, in the preferred embodiment of this invention, is a general purpose computer which interfaces with the storage controller 20 in order to receive, for example, processed data from the digital signal processor 18. Although the storage controller 20 is depicted in a stand alone configuration, it will be understood that the general purpose computer 12 may initialize the files and registers as well as load the control program into the storage controller 20 without departing from the teachings of this invention.

A detailed description of a storage controller 20 constructed according to the preferred embodiment of this invention will now be presented. As shown in FIG. 3, the storage controller 20 consists of bulk memory 200, control logic 24, program memory 46, program memory address generator logic 60, program instruction repeat logic 80, bulk memory address generator 100, flag logic 126, port select logic 146, and port in service logic 176. In general, the control logic 24 controls the various sections of the storage controller 20 during reset, start and stop modes and while waiting for a port to become active.

Program memory 46 contains microinstructions depicting the sequence of data transfer within the digital signal processing system 10. The order in which these instructions are read from the program memory 46 is controlled by the program memory address generator 60 which, in conjunction with the microinstruction presently being executed, the particular port that is active and the program instruction repeat logic 80, generates the addresses for the program memory 46. Program instruction repeat logic 80, in response to selected bits of a decoded microinstruction from the program memory 46, generates control signals which repeat the execution of the particular microinstruction a desired number of times in order to generate the complex strings of memory addresses that are useful in efficiently performing complex arithmetic functions in a digital signal processor. The bulk memory address generator 100 provides the addresses for the bulk memory 200 required to transfer a vector of data words between a particular port and the bulk memory 200. In addition, the bulk memory address generator 100 contains incrementing circuitry which, in response to specific bits of the decoded microinstruction presently being executed, increments a bulk memory address by a predetermined amount to generate the next address in the bulk memory. Flag logic 126, port select logic 146 and port in service logic 176 interact to select or initiate which port is to be used for a data transfer with bulk memory 200 in response to certain bits of a microinstruction, the predetermined priority of the ports and which of the ports is requesting a data transfer. As shown in FIG. 3, the bulk memory 200 interfaces with a plurality of ports, such as input ports 202, 204 and 206, output ports 208, 210 and 212, all of which are unidirectional ports and two bidirectional ports 214 and 216, which connect the bulk memory 200 to the other components in the digital signal processing signal 10 (FIG. 1A) such as the FIFO register 16, the executive terminal 12 and the digital signal processor 18.

A detailed description of the operation and configuration of each of the aforementioned sections of the storage controller 20 will now be presented in order to provide a better understanding of this invention.

The processor control logic 24, shown in FIG. 3 and in greater detail in FIG. 2, controls the storage controller 20 during reset, starting, running, stopping, and waiting for a particular port to become active. Initially, the storage controller 20 is in the reset mode which places the address logic 30 and the counter 32 at the beginning of the reset cycle program contained in PROM memory 38. The counter 32 then counts through a 64 step program required to reset or load all of the files, such as index file 116, address file 62 and repeat file 86 shown in FIGS. 5, 6 and 7, in the storage controller 20. The above files may also be loaded with data from the executive terminal 12 in which case the code for each file is generated by encoder 34 (FIG. 2) which receives select data on bus 36 and port 214 from the executive terminal 12 specifying which file is to be loaded with data. The encoder 34 then generates a 4-bit code representing the desired file which forces the address logic 30 to the specific starting address in the 64 step program of the routine used to load the desired file with data. Count pulses from counter 32 generate addresses in the address logic 30 which cause the appropriate control signals to be read from the PROM memory 38 into the PROM data register 40 which control the multiplexer lines of multiplexer 42 for directing the data into the selected file. For clarity, the data lines connecting a data input device, such as the executive terminal 12, with each of the aforementioned files are not shown; it being understood that these data lines would normally input into multiplexers associated with each file wherein the multiplexers are controlled by control signals from the PROM memory 38. When the 64 step program required to load all of the files in the storage controller 20 has been completed, the PROM data register 40 sends a ENDSEQ signal to the address logic circuitry 30 which places the storage controller 20 in the stop state awaiting a data transfer request from a port.

When no ports are requesting a vector transfer with the bulk memory 200 a NOPORT signal 162 from the port in service logic 176 will keep the storage controller 20 in the stop state. The NOPORT signal 162 forces the address logic 30 to the address in the PROM memory 38 associated with the stop state wherein control signals are selected through multiplexer 42 from PROM memory 38 which hold or retain the present values in all files and registers in the storage controller 20 and prevents new program words from being fetched from the program memory 46. When a port requests service, the NOPORT signal goes low forcing the address logic 30 at an address which causes the first instruction in the program memory associated with the requesting port to be fetched from program memory 46 and then to the address associated with the run mode which causes the multiplexer 42 to select the control signals from the run control gating circuitry 44.

As described above, when the storage controller 20 is in the run mode, control multiplexer 42 switches control from the PROM data register 40 to the run control gating circuitry 44 which provides the proper signals and timing pulses to operate the circuitry, generally shown in FIG. 3, in the manner depicted below.

Figure 4:
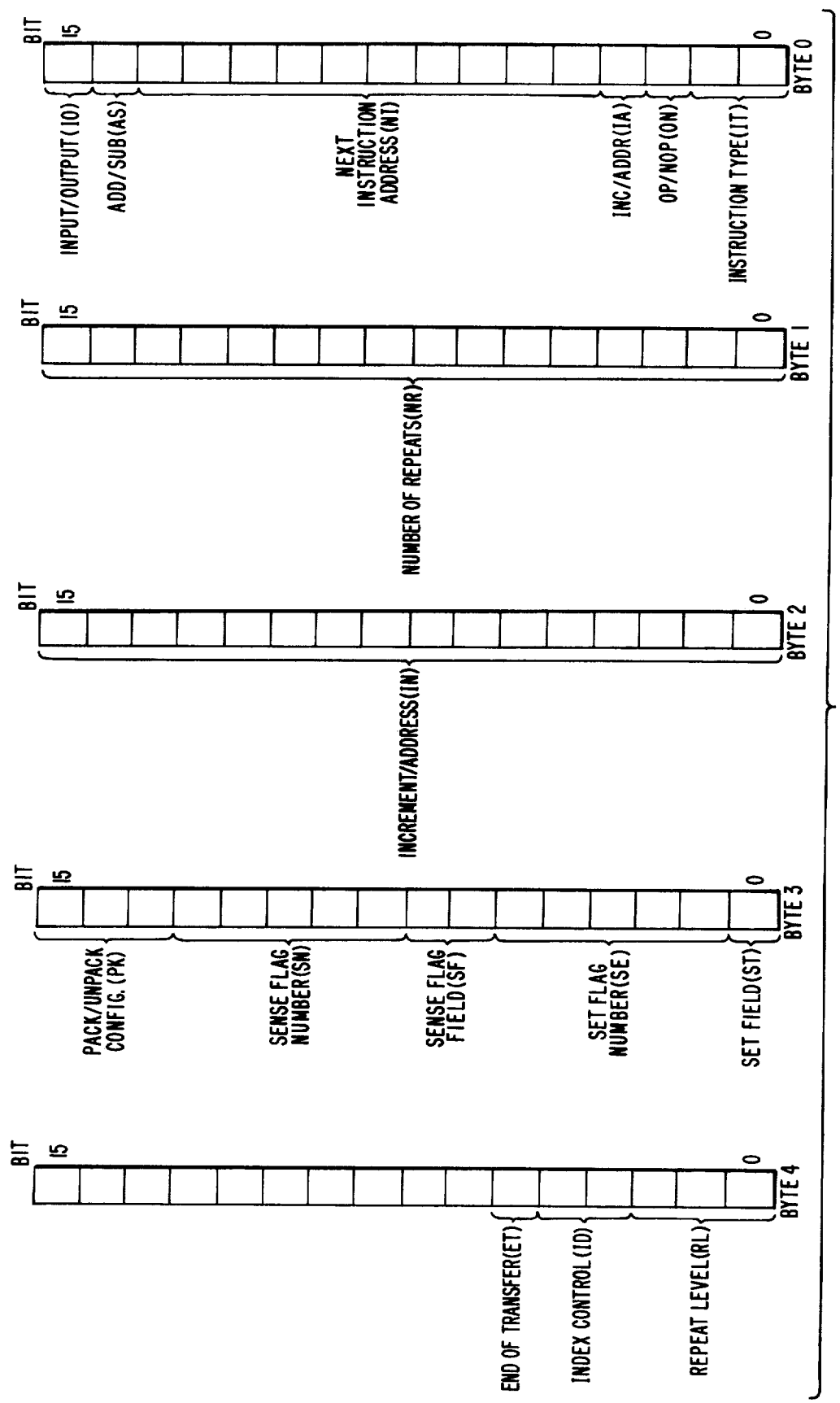
FIG. 4 is a diagram of the microinstruction format used in the storage controller shown in FIG. 3.

According to the preferred embodiment of this invention, the storage controller 20 is controlled by a microprogram stored in program memory 46 which permits the instructions executed by the controller 20 to be changed at any time to allow flexibility in the configuration of the digital signal processing system. Although a random access memory is utilized to store the microinstructions, other suitable storage means, including hardwired circuitry, may also be used without departing from the teachings of this invention. Accordingly, a microprogram structure which has been found to be very useful is indicated in FIG. 4. The basic microprogram instruction word consists of an 80-bit digital data word which is broken down into five 16-bit bytes, labeled byte 0 through byte 4. Each byte of the microprogram instruction word is further divided into sections or fields with each field being assigned an individual function. For example, bits 0 and 1 of byte 0 of each microprogram instruction word indicate the instruction type (IT); while bits 4 through 13 of byte 0 are used to store the next instruction address (NI). Each field of the instruction word contains a binary code representative of predetermined constants which are decoded by the storage controller 20 in order to generate control signals useful in controlling the operation of the storage controller 20. Throughout the remainder of this application the term "program word" will be used to generally describe the predetermined constants stored in binary form in the program memory 46. The functions of the remaining sections of each microprogram instruction word will be described in conjunction with the various logic sections of the storage controller 20. As each program word is read from memory 46, the various fields are sent via bus 78, FIG. 3, to the respective logic sections of the storage controller 20 wherein they are decoded and executed in order to generate control signals that are useful in controlling the transfer of a vector of data words.

Figure 5:
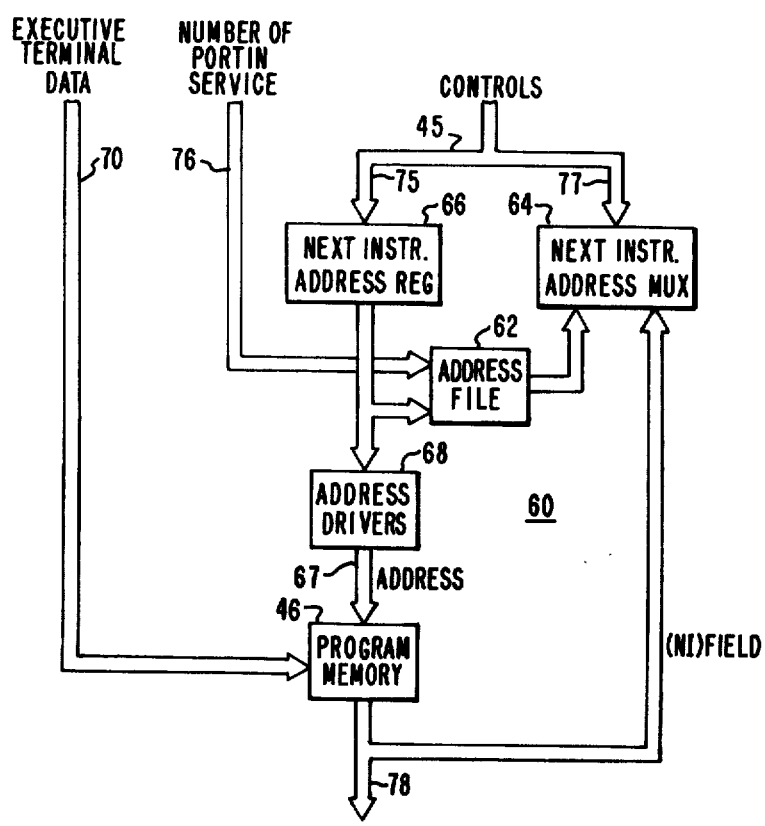
FIG. 5 is a detailed block diagram of the program memory address generator of the storage controller shown in FIG. 3.

Referring to FIGS. 3 and 5, there is shown a block diagram of the program memory address generator 60 and the program memory 46. According to the preferred embodiment of this invention, program memory 46 contains 1K of 80-bit words, although different configurations for the program memory 46 may be used as memory requirements dictate. The basic memory device is a 1K random access memory (RAM) chip of which there are 80 in order to provide the 1K of 80-bit instruction words. Separate programs depicting the sequence of data transfer between the bulk memory 200 and each of the eight ports may be stored in the program memory 46. The Instructions to be stored in the program memory 46 may be loaded from the executive terminal 12 (FIG. 1A) via bus 70 and port 214 under the control of the storage controller control logic 24 when the storage controller 20 is in the reset mode; or when the storage controller 20 operates as a stand alone device, they may be loaded into memory 46 by any suitable progamming device.

The addresses used to select or fetch each microprogram instruction word from the program memory 46 are generated by the program memory address generator 60 which includes address file 62, next instruction address multiplexer 64, next instruction address register 66 and address drivers 68. The address file 62 includes eight 10-bit registers, one for each port, each of which contains the address of the next instruction in the program memory 46 to be fetched in the program specifying vector transfer for each port. Initially, each register in the address file 62 contains the starting address of the program for vector transfer for each port. If an interrupt or port change occurs during transfer, address file 62 will hold the address of the interrupted port until the program associated with a higher priority port is completed, whereon the interrupted program will continue to be executed in normal fashion.

The next instruction address multiplexer 64 selects the source of the next instruction address to be fetched: either from the address file 62 or the (NI) field of the program memory instruction word. The selection of the multiplexer 64 is controlled by the run control gating signals 77, from the run control logic section 44, shown in FIG. 2, which generates signals indicative of the (IT) field, the present number of repeats of an instruction and any port change occurrences. The next instruction address register 66 holds the address while the program memory 46 is being addressed through the address drivers 68 via address bus 67 and the program word fetched therefrom. The next instruction address register 66 either holds the present address in the register 66, loads a new address from the next instruction address multiplexer 64 or increments the present address by one under the control of the run control signals 75 from the run control logic 44.

In normal operation, the first instruction address, depicting a vector transfer for a particular port, is selected from the address file 62 by the port in service signal 76, gated through the next instruction address multiplexer 64 and loaded into the next instruction address register 66. The run control signals 77 then switch the multiplexer 64 to select the output of the next instruction address field (NI) of the program memory instruction word as long as the same port remains active. The data stored in the program memory 46 at the address location held in the next instruction address register 66 is fetched by the address drivers 68 and decoded by suitable means to generate control signals which are placed on the bus 78 for communication to the various components of the storage controller 20. An address will be held in the next instruction address register 66 until the appropriate control signal 75 is received from the run control logic 44, at which time the address in the next instruction address register 66 will either be incremented by one at the completion of a jump type instruction, described hereafter, or a new address selected through the next instruction address multiplexer 64 will be loaded into the address register 66. In either event, the address file 62 is loaded with the address held in the next instruction address register 66 each time an instruction is fetched from the program memory 46 thereby indicating the current step in the program of a vector transfer for a particular port that is being executed.

The above-described operation applies when the decoded instruction type (IT) bits of the program word gated through the run control gating 44 indicate an increment repeat type of instruction. When an increment repeat instruction is fetched, the next instruction address register 66 will hold an address until the correct number of repeats signal 74 have been received from the program instruction repeat logic 80 by the run circuitry 44, FIG. 2, at which time the next instruction address (NI) of a program word will be loaded through the multiplexer 64 into the next instruction address register 66. When a jump repeat instruction is indicated by the (IT) bits of an instruction word, the next instruction address field (NI) is loaded through the multiplexer 64 into the next instruction address register 66 each time that the jump repeat instruction is fetched in order to create a loop. When the proper number of repeats of a jump repeat instruction have taken place, the program instruction repeat logic 80, shown in FIG. 6, will send a signal 74 to the run control gating 44 which will increment the address contained in the next instruction address register 66 (FIG. 5) by one, instead of loading the next instruction address (NI) through the multiplexer 64, and thereby cause the program to fall through the jump loop and fetch the next sequential instruction in the program memory 46.

Figure 6:
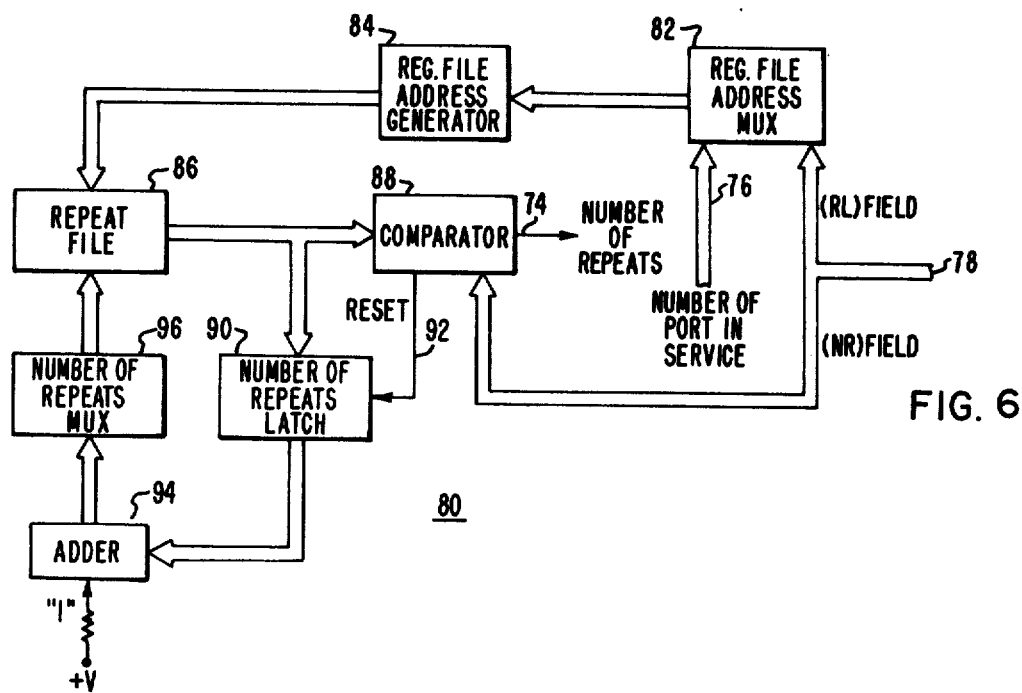
FIG. 6 is a detailed block diagram of the program instruction repeat logic of the storage controller shown in FIG. 3.
Figure 12:
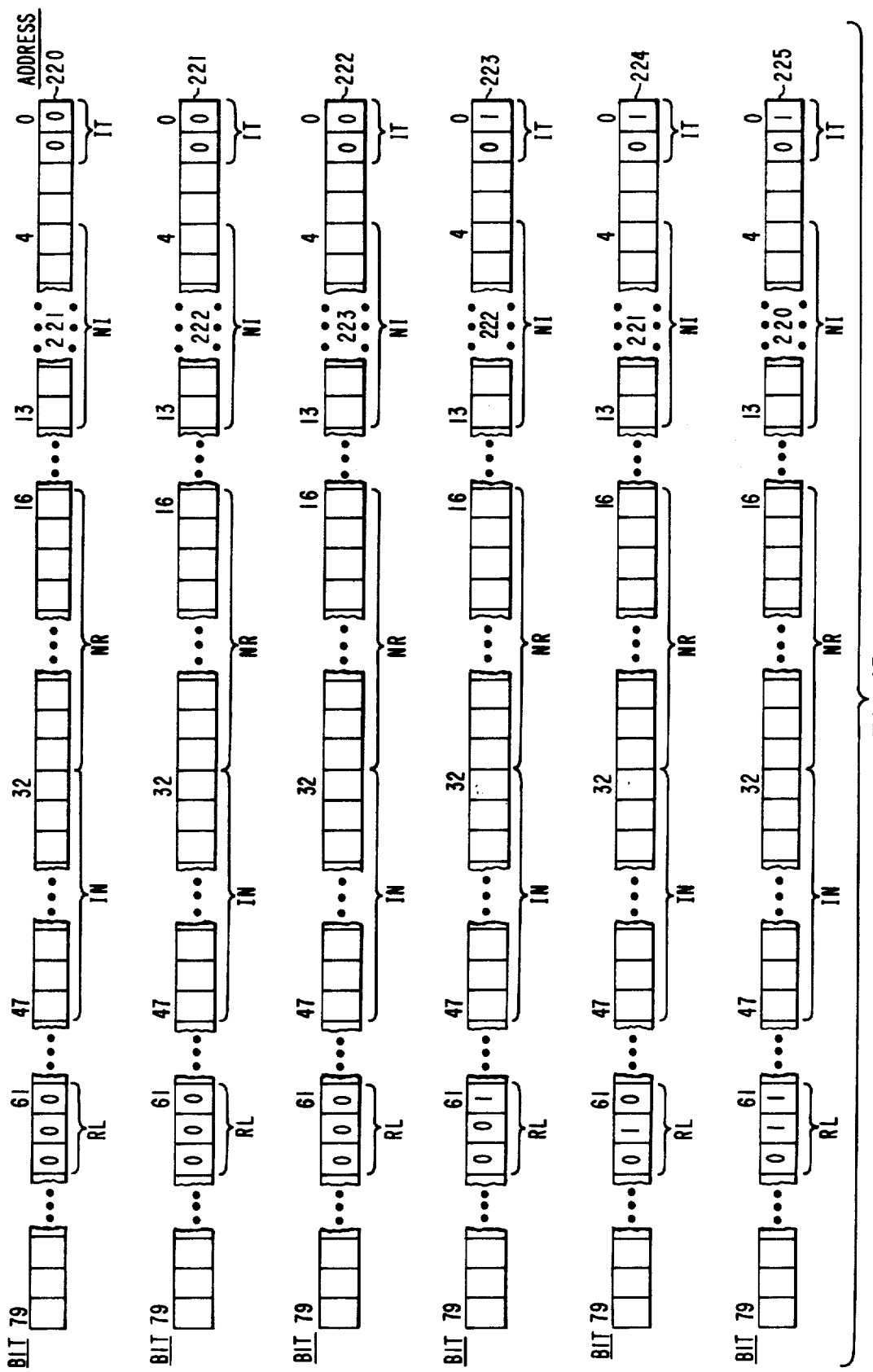
FIG. 12 is a diagram illustrating the use of the repeat level field of a microinstruction.

Each port has eight available repeat registers, in repeat file 86, FIG. 6, which are selected by the repeat level (RL) field of a program memory instruction word and store the number of times an instruction has been executed. These eight registers and the jump repeat instruction described above provide the storage controller with the capability to have up to seven nested loops within a program for a particular port. An example of the use of the repeat level field and jump repeat instruction is shown in FIG. 12 involving a series of sequential program memory instruction words 220, 221, 222, 223, 224 and 225. These instruction words control the transfer of a vector of data between a particular port and the bulk memory 200. Furthermore, in each instruction word only certain fields are shown, it being understood that each instruction word contains the full 80 bits described above. According to the preferred embodiment of this invention, an (IT) field code of "00" indicates an increment repeat instruction while a code of "01" signifies a jump repeat instruction. The (RL) field of each instruction word contains a 3-bit binary code which represents the number of the repeat level from 0 through 7; with repeat level 0 being used in conjunction with the increment repeat instruction and the remaining repeat levels used with the jump repeat instructions. For the purposes of this example, the addresses stored in the (NI) field of each program word are indicated in FIG. 12 by the reference numbers associated with each program word shown therein. In actual practice, these addresses, such as address 221 in the (NI) field of word 220 in FIG. 12, would be stored in a binary code representative of the actual address location in the program memory 46 wherein program word 220 is stored.

Accordingly, the storage controller 20 will, in transferring a vector of data words between a port whose program includes the instruction words shown in FIG. 12 and the bulk memory 200, fetch instruction words 220, 221 and 222, each of which is an increment repeat instruction, sequentially from the program memory 46. Each of the instruction words 220, 221 and 222 will be executed the number of times specified in its (NR) field; generating in response to each execution, a new address for bulk memory 200 which is the increment specified in its (IN) field from the previous bulk memory 200 address. After each of the instruction words 220, 221 and 222 have been executed the specified number of times, the address specified in the (NI) field of the instruction word, such as address 223 in the (NI) field of instruction word 222, will be loaded through multiplexer 64 into the next instruction address register 66, shown in FIG. 5, and the instruction word stored at that address location will be fetched from the program memory 46.

Continuing with the example, after instruction word 222 has been executed the specified number of times, the address specified in its (NI) field, which is address 223 as seen in FIG. 12 to be indicating word 223, will be loaded into the next instruction address register 66, FIG. 5, as described above, and the word at address 223 fetched from the program memory 46 and executed. Since instruction world 223 is a jump repeat instruction, (IT) field code is "01", after it is executed the first time, the instruction word stored at the address indicated by the (NI) field of instruction word 223, which is instruction word 222, will be fetched and repeatedly executed in the normal manner. Thus, a loop is formed between instruction words 222 and 223 which is repeatedly executed the number of times specified by the constant stored in the register in repeat file 86 indicated by the (RL) field of the jump instruction, such as instruction 223 whose (RL) field is set to a binary code "001" specifying the first register of the eight registers associated with the port in repeat file 86, shown in FIG. 6.

When the loop formed by instruction words 222 and 223 has been executed the specified number of times, the address in the next instruction address register 66 will be incremented by one, through circuitry described hereafter, in order to fall through the loop to the next sequential instruction word in the program memory 46, which according to the example shown in FIG. 12 is instruction word 224. As instruction 224 is also a jump repeat type of instruction, the next instruction to be executed is that contained in the next instruction address field (NI) of instruction 224 which, according to the example, is instruction 221. Instruction 221 will be repeatedly executed in the normal manner the required number of times before the first loop of instructions 222 and 223, described above, will be re-executed. In this manner a second loop having the first loop nested therein is created which will be executed the number of times specified in the register in repeat file 86 indicated by the (RL) field of instruction 224. In a similar manner, a third loop comprised of instructions 225 and 220 is provided in FIG. 12 wherein each instruction or nested loop contained inside of the third loop created by instructions 225 and 220 will be repeatedly executed as described above. It should be noted that each loop is given a different repeat level number, such as the loop formed by instructions 222 and 223 which is given a repeat level (RL) field of one; while the loop created by instructions 224 and 221 has a (RL) constant of two.

Referring to FIGS. 3 and 6, there is shown the program instruction repeat logic 80 that determines if an instruction, the address of which is held in the next instruction address register 66 of FIG. 5, has been executed the number of times specified in the (NR) field of the last fetched program instruction. The 3-bit binary port in service signal 76 and the 3-bit (RL) field of an instruction are selected by multiplexer 82 and combined in the register file address generator 84 to form a 6-bit address which accesses the repeat files 86. The repeat file 86 contains 64 16-bit registers, one for each repeat level field of the 8 ports utilized in the preferred embodiment of this invention. Each register in the repeat file 86 contains the present number of times an instruction has been executed. Comparator 88 compares the number of repeats value stored in the particular register in repeat file 86 accessed by address generator 84 with the (NR) field of the instruction presently being executed to determine if the instruction has been executed the required number of times. When the two values agree, comparator 88 sends a signal 74 to the run control logic 44 in control logic section 24 wherein it is used in conjunction with the type of instruction (IT) presently being executed to determine if the address held in the next instruction address register 66 is to be incremented by one or loaded with an address from the next instruction address multiplexer 64.

Referring again to FIG. 6 the number of repeats latch 90 stores the output of the repeat file 86 while the data contained therein is being incremented and rewritten back into the repeat file 86. The output of the number of repeats latch 90 is disabled or reset to zero when comparator 88 sends a reset signal 92 to the number of repeats latch 90 indicating that the instruction has been executed the required number of times. Adder 94 is used to increment the output of the number of repeats latch 90 by one. When the reset signal is generated by the comparator 88 the output of the number of repeats latch 90 will be zero and the output of the adder 94 will be a one which is the initial reset value of the repeat file registers 86. The number of repeats multiplexer 96 selects either the output of adder 94 or data from the executive terminal 12 (not shown) to load the repeat file 86 registers.

Figure 7:
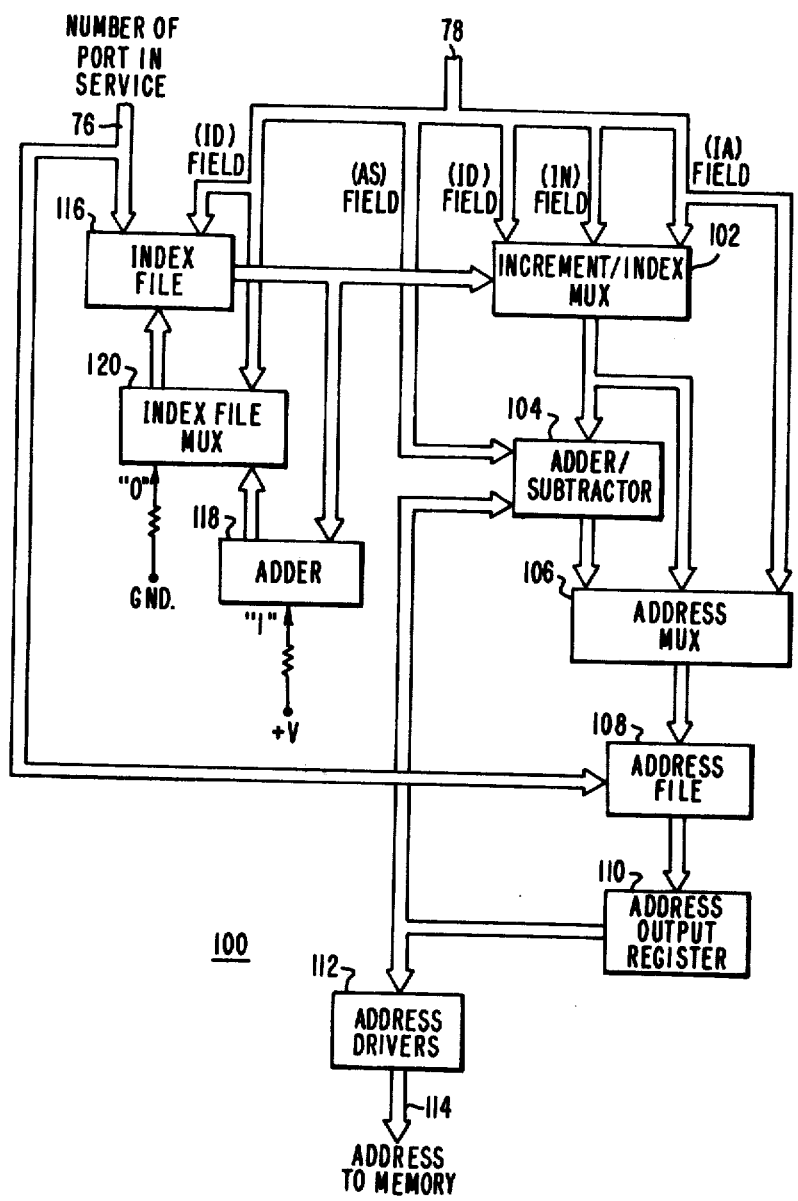
FIG. 7 is a detailed block diagram of the bulk memory address generator logic of the storage controller shown in FIG. 3.

FIGS. 3 and 7 depict in block diagram form the bulk memory address generation logic 100 used to generate the addresses for bulk memory 200 utilized in the transfer of data between the bulk memory 200 and a particular port. According to the preferred embodiment of this invention, bulk memory 200 contains 32K of 32 bit words, arranged in 4 blocks of 8K words each. The blocks are sequentially addressed in an interleaved fashion, in order to obtain a combined data rate that is four times than that of each block. In such a configuration, address 1, for example, would be in block 1, while address 2 would be in block 2 and so on.

The bulk memory address logic 100, shown in FIG. 7, contains an index file 116 which consists of eight 16-bit registers, one for each port, which are accessed by the 3-bit code contained on the port in service data bus 76.

The control data for writing into the registers of the index file 116 is decoded from the index control (ID) field of each program memory instruction word. As shown in FIG. 4, the (ID) field comprises 2 bits of each instruction word wherein a "00" code indicates no index register operation, "01" code is used to reset the index register to zero, "10" is used as a select to multiplexer 102 of the bulk memory address generator logic 100 for selecting the contents of a particular index register in place of the (IN) field of a program instruction and "11" is used to increment the contents of an index register by "1". A 16-bit adder 118, in FIG. 7, is used to increment the contents of a register from the index file 116 by "1". Multiplexer 120, under the control of the decoded (ID) field of a program instruction word, selects either the output of adder 118 or a constant "0" for incrementing or resetting an index register in the index file 116.

Multiplexer 102, under the control of the decoded (ID) field of a program instruction word, selects the increment for the next bulk memory address to be generated from either the output of the index file 116 or the increment/address (IA) field of the program instruction word. When the (IA) bit of the program instruction word is set to a "1", the increment/address (IN) field of the program instruction word will be used as an increment; if it is set to a "0", the (IN) field indicates an absolute address. A 2-input, 16-bit adder/subtracter 104 increments or decrements the present bulk memory address from the bulk memory address output register 110 by the output of multiplexer 102 under the control of the add/subtract (AS) bit of the program instruction word. The output of adder 104 is used as an input to multiplexer 106 which selects either the incremented bulk memory address from the adder 104 or the absolute bulk memory address from mutliplexer 102 under the control of the (IA) field of the program instruction word as described above. The bulk memory address generated by multiplexer 106 is written into one of the eight 16-bit registers in the bulk memory address file 108, selected by the port in service signal 76, and is immediately loaded into the bulk memory address output register 110 for output through the bulk memory address drivers 112 to the bulk memory 200 on address bus 114. The means for transferring the data words into and out of the address locations in memory 200, generated by the aforementioned logic, includes various timing circuitry (not shown) which, along with the decoding of the pack/unpack field (PK) of the program word, described hereafter, generates the appropriate read and write pulses to the individual chips comprising the bulk memory 200.

Thus, program memory address generator 60, program instruction repeat logic 80 and the bulk memory address generator 100 interact under the control of the instructions stored in the program memory 46 to generate the addresses in the bulk memory 200 to be used in tranferring a vector of data words between the bulk memory 200 and a particular port of the storage controller 20. By use of its repeat and incrementing capabilities, the storage controller 20 can store vectors of data from input devices, such as the FIFO register 16 shown in FIG. 1A, at non-sequential address locations in the bulk memory 200. Furthermore, the storage controller 20 can transfer a second vector of data from different, non-sequential address locations in the bulk memory 200 to the digital signal processor 18 in a form that simplifies the computation of complex arithmetic functions, such as an FFT, by the digital signal processor 18 which greatly reduces the amount of data handling required in the digital signal processor 18 and thereby increases its throughput capability.

The storage controller 20 improves the processing capability of a digital signal processing system by independently initiating and controlling the transfer of vectors of data words between the various components of the digital signal processing system, such as input devices, a digital signal processor, and a bulk memory. In this manner, the input devices or the digital signal processor can process a vector of data at its own data rate independent of the operation of the other components in the digital signal processing system.

Figure 8:
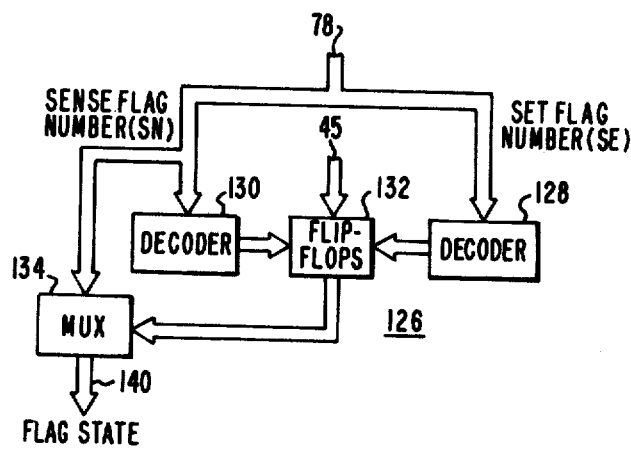
FIG. 8 is a detailed block diagram of the flag logic of the storage controller shown in FIG. 3.

The determination, selection and control of a transfer of a vector of data words between a particular component and the bulk memory 200 of the digital signal processing system 10 is controlled by the flag logic 126, port select logic 146 and port in service logic 176 sections of the storage controller 20. Referring to FIGS. 3 and 8, there is shown the flag logic circuitry 126 used to set, reset and sense the flags utilized in the storage controller 20. Although storage is provided for 32 flags in flip-flops 132 in the preferred embodiment of this invention, for clarity, only one flag will be described in conjunction with each component of the digital signal processing system 10. Each program instruction word contains specific bits labeled set field (ST) and set flag number (SE). If the set field (ST) of a particular program instruction word is a "1", at the completion of the execution of that instruction word the flag that is specified by the set flag number field (SE) will be set to a "1". This is accomplished in the decoder 128 which decodes the set flag number (SE) from the executed program word and generates the appropriate control signals to set one of the flip-flops 132 specified in the set flag field (SE) of the program instruction word. The set field (ST) and, also, the sense flag field (SF) described hereafter are decoded by the run control gating 44, shown in FIG. 2, which issues the appropriate control signal via bus 45 to the flag logic 126 to control the setting, resetting and sensing of the flag as described herein.

Each program instruction word also contains bits labeled sense flag field (SF) and sense flag number (SN) which are used to synchronize the data flow between the various ports of the storage controller 20 and also to cause conditional branches in the program stored in the program memory 46. If the sense flag field (SF) of a program word is "00", no sense operation takes place when a program instruction is executed. If the sense flag field is "01", a conditional sense operation occurs when the instruction is fetched from the program memory 46. A conditional sense checks for the presence of the flag that is specified in the sense flag number field (SN). If the flag specified therein is set, the instruction is executed and the particular flip-flop 132 associated with the flag is reset through decoder 130 at the completion of the instruction. The next instruction fetched from memory is that which is specified in the next instruction field (NI), as described above. If the flag is not set, the instruction is not executed and the address of the instruction where the sense operation was programmed is incremented by one in order to produce the next instruction word address, thereby providing a branch in the program, depending upon the condition of the flag. If the sense flag field is "11", an unconditional sense will occur regardless of the actual state of the flag. Before a fetched instruction is executed, the unconditional sense checks for the presence of the flag that is specified in the sense flag field (SN). If the flag is set, the instruction is executed and the flag is reset at the completion of the instruction as above. If the flag is not set, the program execution for that particular port will be halted until the flag specified in the instruction is set by another port program. When the specified flag does get set, the program for that port will be able to continue as normal. This operation is used to synchronize data flow between ports, such as sensing for the state of a particular flag to prevent accidental unloading of a partial vector of data. The sense operation is accomplished in decoder 130 which decodes the sense flag field number (SN) and generates the necessary control signals to reset or sense the state of one of the flip-flops 132. An indication of the state of each flag bit is produced by multiplexer 134 which has as its inputs the sense flag number field (SN) of the instruction word and the output of the flip-flops 132 associated with the flag specified in the sense flag number field (SN). The state of a particular flag bit is therefore present on bus 140 which is connected to the port select logic 146.

Figure 9:
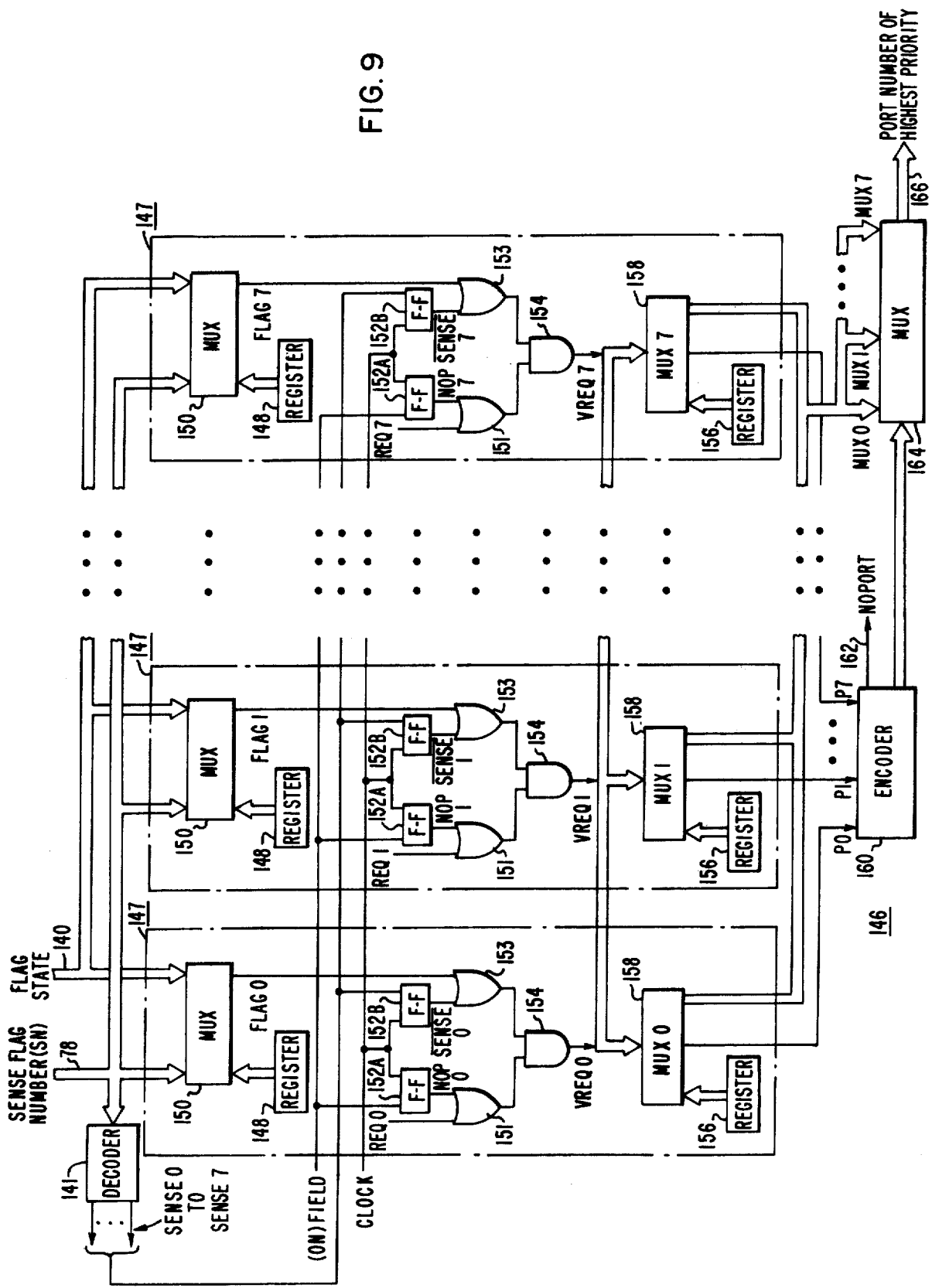
FIG. 9 is a detailed block diagram of the port select logic of the storage controller shown in FIG. 3.

The selection of which port is to be placed in service is based on several factors such as the type of instruction, flags, requests and the priority assigned to each port of the storage controller 20. The port select logic circuitry 146, as shown in FIGS. 3 and 9, initiates a vector transfer by selecting one of the ports to be placed in service as described hereafter. A register 148 is provided for each port of the storage controller 20 in which is stored the encoded value of the flag associated with each port. Since the circuitry to be described in detail hereafter is identical for each port of the storage controller 20, only that circuitry 147 associated with port "0" will be described in detail. Accordingly, the value stored in register 148 along with the sense flag number field (SN) of the program instruction word activate one of the multiplexers 150 which in turn uses the state of the flag bit carried on bus 140 to provide a signal FLAG 0 which when high indicates the flag sensed is set.

In order for a port to be placed in service, a no-op instruction must be executed or the port must have made a request to be placed in service, in which case its flag must be set. The circuitry required to implement this includes flip-flop 152A which stores the state of the (ON) field of a program instruction word which, when set to "1", indicates a data transfer is to take place. Flip-flop 152A outputs a signal labeled NOP0 when the (ON) field is a "1" which is OR'ed in OR gate 151 with the request signal for port 0 REQ0. Flip-flop 152B stores the state of the (SN) field, as decoded by the decoder 141, and when it equals a "1" outputs a signal labeled $\overline{\text{SENSE0}}$ which is OR'ed in OR gate 153 with the FLAG0 signal from multiplexer 150. The output of the OR gates 151 and 153 are AND'ed together in AND gate 154, the output of which is a signal called VREQ0 which indicates that the proper conditions are present for a particular port to be made active.

If more than one VREQ signal is generated, the port to be activated is determined on the basis of priorities preassigned to each port of the storage controller 20. Each port is assigned a priority from 0 through 7 which is initially loaded into a 3-bit register 156. The 3-bit priority for each port is used as a select for a multiplexer 158 which has its input the VREQ0 through VREQ7 signals. The outputs of the multiplexers 158, labeled P0 through P7 indicate if a port, assigned a given priority, is to be made active. The P0 through P7 signals are applied to a priority encoder 160, the output of which is a 3-bit word representing the highest priority signal present on the input of the encoder 160. If no port is requesting service, priority encoder 160 will generate a NOPORT signal 162. The 3-bit output of the priority encoder 160 is used as the select for multiplexer 164 which has as its inputs the 3-bit priority numbers associated with multiplexers 158. The 3-bit output 166 of multiplexer 164 therefore represents the port number associated with the highest priority port which is requesting a data transfer with the bulk memory 200 of the storage controller 20.

Figure 10:
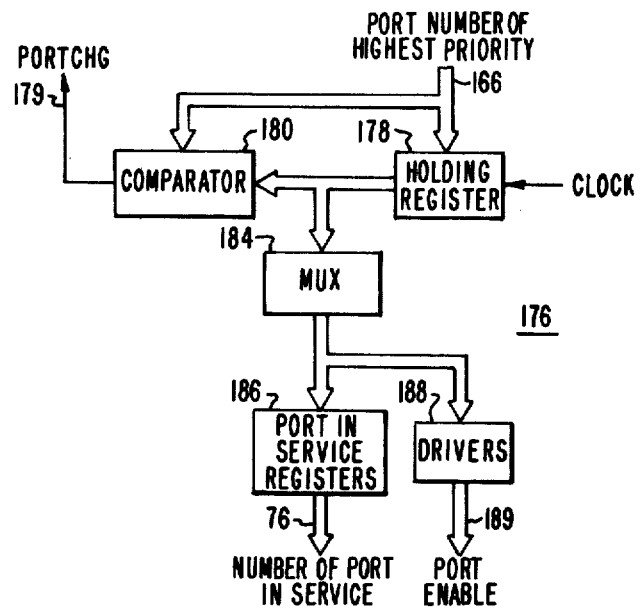
FIG. 10 is a detailed block diagram of the port in service logic section of the storage controller shown in FIG. 3.

The output 166 of the port select logic circuitry 146 is connected to the port in service logic 176, which is shown in FIG. 3 and in greater detail in FIG. 10. Data bus 166 carries the 3-bit port number of the highest priority port requesting a data transfer with the bulk memory 200 which is clocked into a holding register 178. Upon each clock pulse, the output of the holding register 178 along with the input to the holding register 178 is loaded into a comparator 180. Whenever a port change or interrupt occurs, that is, a port with a higher priority than the one previously indicated on data bus 166 requests a data transfer, the two inputs of comparator 180 will be different until the holding register 178 is clocked again. The output of the comparator 180, in such a case, is signal 179, labeled PORTCHG indicating that a port change is taking place; which, via the run control circuitry 44, causes the starting address of the program associated with the higher priority port to be read from the address file 62 and multiplexer 64 of the address generator logic 60 into the next instruction address register 66 shown in FIG. 5. The output of the holding register 178 also goes to multiplexer 184 which in turn sends the port number to the port drivers 188, which send the port number signal via bus 189 to the input multiplexer 205, output multiplexer 207 and bidirectional multiplexer 215, all shown in FIG. 3, where it acts as a select to enable or activate the particular port specified for a data transfer, and also to the port in service registers 186 for distribution on port in service bus 76 to the various registers and files in the storage controller 20.

Additional bits of the program instruction word which are of interest and have not been described previously include, among others, the input/output (IO) bit. This bit designates the program instruction word as being either an input to the bulk memory 200 or an output from the bulk memory 200, with a "1" being used to indicate an output and a "0" indicating an input. This bit is used in conjunction with the bidirectional ports 214 and 216 of the bulk memory 200 in order to specify the direction of data flow.

The pack/unpack configuration (PK) field of the program instruction word controls the format of the data which is written into and read out of the bulk memory 200 and is useful in handling the real and imaginary portions of data associated with complex arithmatic functions, such as a Fast Fourier Transform. If the 3-bit (PK) field is "000", all 32 bits present on the input bus of the bulk memory 200 during execution of an input instruction will be loaded as a 32-bit word into the address specified by the bulk memory address generator 100 or all 32 bits of the word will be read out to the output bus of the bulk memory 200 during an output instruction. If the (PK) field contains the code "100", the lower 16 bits of data on the input bus will be stored in the lower 16 bits of the address location specified by the bulk memory address generator 100 when executing an input instruction. If an output instruction is being executed, the entire 32-bit word in the bulk memory is placed on the output bus. If the (PK) field contains the code "101", the lower 16 bits of the input bus will be written into the upper 16 bits (bits 16 through 31) of the address location specified by the bulk memory address generator 100 when executing an input instruction. When an output instruction is being executed, the upper 16 bits of the word stored in the bulk memory will appear in the lower 16 bits (bits 0 through 15) of the output bus and the lower 16 bits of the word will appear on the upper 16 bits of the output bus. If the field contains the code "110", the upper 16 bits of the word on the input bus will be written into the lower 16 bits of the address location specified by the bulk memory address generator 100 when executing an input instruction. If an output instruction is being executed, the upper 16 bits of the bulk memory word will appear on the lower 16 bits of the output bus, and the lower 16 bits of the bulk memory word will appear on the upper 16 bits of the output bus. If the (PK) field contains the code "111", the upper 16 bits of the input bus will be stored in the upper 16 bits of the word addressed by the bulk memory address generator 100 when executing an input instruction. If an output instruction is being executed, the entire 32-bit word stored in the bulk memory is placed on the output bus.

Figure 11:
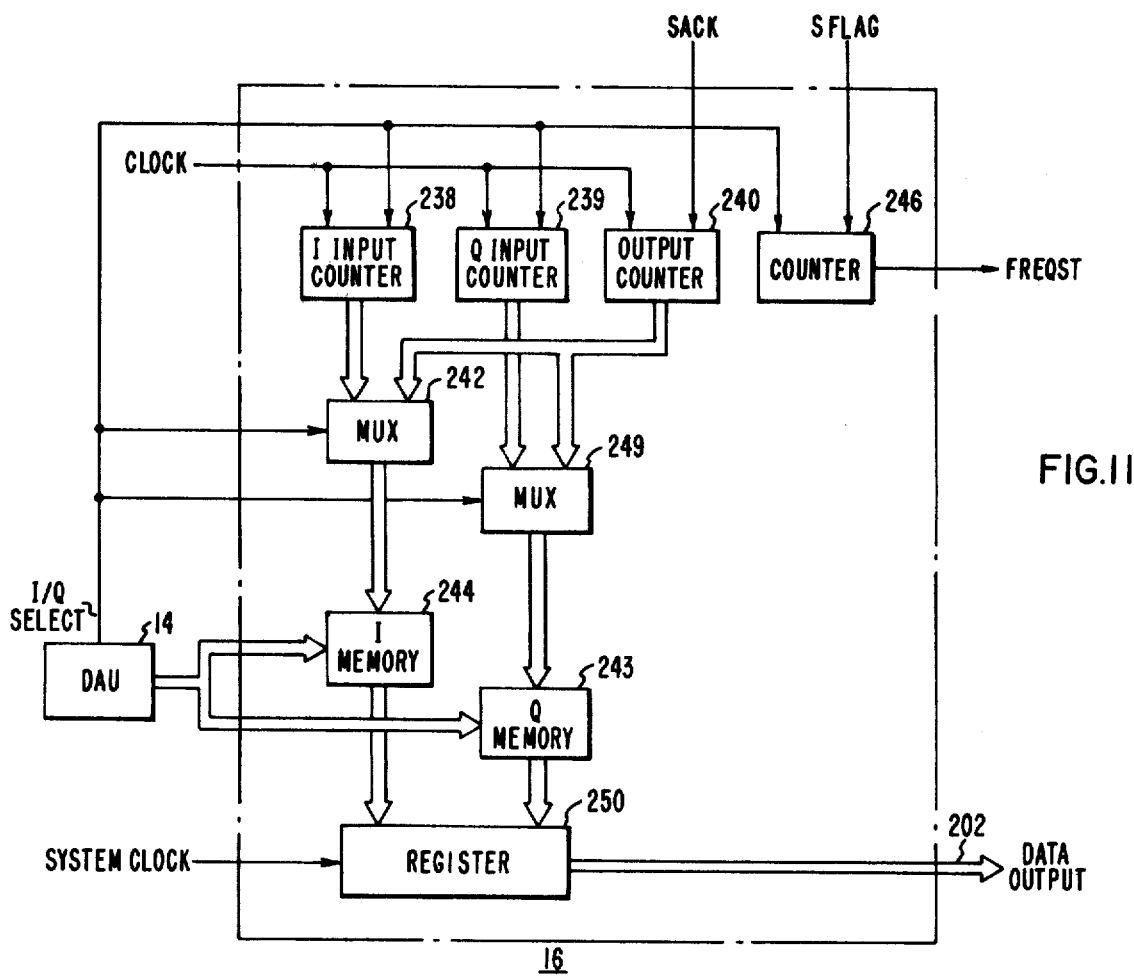
FIG. 11 is a detailed schematic and block diagram of the FIFO register shown in FIG. 1A.

As shown in FIG. 1A, a FIFO register, such as FIFO 16, is used to collect external data from a data acquisition unit, such as DAU 14, and transfer the data on a first in-first out basis to the storage controller 20. A detailed block diagram of a FIFO register 16, constructed according to the teachings of this invention, is shown in FIG. 11. The data acquisition unit 14 interfaces with a source of electrical signals, typically along in nature, and outputs digitized data words representative of the analog signals to the FIFO 16. As the construction and use of data acquisition units is well known, the detailed construction of the data acquisition unit 14 will not be described in this application.

In actual operation, the FIFO register 16 receives input data, from the DAU 14 in the form of 16-bit words which are alternately real (I) data or imaginary (Q) data. An I/Q SELECT signal from the DAU 14 indicates the types of data word in which a "1" signifies real (I) data and a "0" indicates imaginary (Q) data. The I/Q SELECT signal enables either the I input counter 238 or the Q input counter 239 depending on the type of data being transferred; both of which count at the FIFO register 16 clock rate. The output from counters 238 and 239 are used as addresses for the I memory 244 and the Q memory 243, respectively; each of which, according to the preferred embodiment of this invention, is capable of storing 256 of 16-bit data words. The addresses or counts from counters 238 and 239 selected by multiplexers 242 and 249, respectively, under the control of the I/Q signal, to access the I and Q memories 244 and 243, respectively, and thereby store the I and Q data from the DAU 14 in the specified address locations.

In addition, the I/Q SELECT signal is an input to counter 246 which counts the number of complete data words, 16 bits (I) data and 16 bits (Q) data, that have been loaded into the memories 244 and 243 from the data acquisition unit 14. Counter 246 is an up/down counter which counts up every time it receives an I/Q SELECT signal and counts down every time it receives SFLAG signal from the storage controller 20. The SFLAG signal from the storage controller 20 is issued every time a complete 32-bit word of data has been transferred from the FIFO 16 to the storage controller 20. Counter 246 will generate a signal, labeled FREQST, when the predetermined number of data words forming a vector of data words have been received from the data acquisition unit 14 and stored in the FIFO memories 244 and 243. This FREQST signal, which would also be called REQ0, shown in FIGS. 3 and 9 and described previously, in the case where FIFO register 16 is port "0", acts as a request to the storage controller 20 for a data transfer from FIFO 16 to the bulk memory 200 of the storage controller 20. When the storage controller 20 acknowledges and activates the port associated with the FIFO register 16 for data transfer in the method described above, it will generate a signal, labeled SACK, which enables the output address counter 240 to generate a sequential series of address locations which are multiplexed through multiplexers 242 and 249 thus enabling the data stored at the specified address locations to be read out of the memories 244 and 243 and into holding register 250 which forms the 16-bit (I) word and the 16-bit (Q) word into the 32-bit word format utilized in the storage controller 20. The 32-bit word is then placed on the input data bus 202 to be transferred to the bulk memory 200 of the storage controller 20. As described above, each time a complete data word of the vector of data words to be transferred from the FIFO register 16 to the bulk memory 200 is received by the storage controller 20, the storage controller 20 will generate a signal labeled SFLAG which counts down the counter 246 to zero, thereby indicating that the complete vector has been transferred from the FIFO register 16 to the storage controller 20. In this manner, the FIFO register 16 stores a complete vector of data in memories 244 and 243 before it issues a request to the storage controller 20 for a data transfer to the bulk memory 200. This enables the other components of the digital signal processing system 10 to function independently while a vector of data is being stored in the FIFO register 16. It may be desirable to utilize two or more FIFO registers, such as FIFO registers 16 and 16A shown in FIG. 1A to further increase the throughput of the digital processing system. In such a case, each FIFO would be connected to a different port of the storage controller 20 and, then, operate independently of each other so that one FIFO register may be transferring a vector of data words to the storage controller 20; while the other FIFO register is accumulating a new vector of data words from the data acquisition unit.

Referring again to FIGS. 1A and 3, the overall operation of a storage controller 20 constructed according to the teachings of this invention in a digital signal processing system 10 will now be described. In connecting the components to the storage controller 20, FIFO1 register 16 will be connected to input port 202 of the bulk memory 200, FIFO2 16A to input port 204, the executive terminal 12 will be connected to bidirectional port 214 and the digital signal processor 18 connected to an input port 206 and output port 212. After all of the registers in the storage controller 20 have been initialized, the storage controller 20 will enter a stop state awaiting a request for a vector transfer from one of the ports. In a normal sequence, the data acquisition unit 14 will begin to input data words to the FIFO1 register 16. When a complete vector of data words has been stored in the FIFO1 register 16, FIFO1 16 will issue a request to the storage controller 20 for a vector transfer of the data to the bulk memory 200. If no other higher priority devices are simultaneously requesting a vector transfer or presently transferring a vector, the storage controller 20 will recognize the request from the FIFO1 register 16 and generate a port in service signal activating port 202 which connects the FIFO1 register 16 to the bulk memory 200. The port in service signal will cause the program memory address generator 60 of the storage controller 20 to jump to the beginning address in the program memory 46 of the portion of the program stored therein that specifies the sequence of vector transfer with the FIFO1 register 16. As previously described, the storage controller 20 can repeatedly execute an individual program instruction word and generate, in response thereto, a string of memory addresses for the bulk memory 200 wherein each data word of the vector of data words transferred from the FIFO1 register 16 will be stored. Depending upon the application, different increments between consecutive memory addresses may be desired within the complete vector of data words that is being transferred. In such a case, storage controller 20 will execute additional program words to generate the desired string of memory addresses and store the data from the FIFO1 register 16 in these address locations of the bulk memory 200. When the complete vector of data words has been transferred from the FIFO1 register 16 into the bulk memory 200, the storage controller 20 will again enter a stop mode until another port requests a data transfer. Continuing in a normal sequence, the digital signal processor 18 will be requesting a transfer of a vector of data from the bulk memory 200. Again, the storage controller 20 will recognize the request from the digital signal processor 18, if no higher priority component is requesting or executing a data transfer, by generating a port in service signal which energizes the output port 212 connecting the bulk memory 200 with the digital signal processor 18. This port in service logic signal will cause the program memory address generator 60 to jump to the beginning address of the portion of the program stored in the program memory 46 associated with the digital signal processor 18 and begin execution of the instructions contained therein. In certain instances it may be desirable to read the data out of the bulk memory 200 in a different order in which the data has been read in and stored. In such an instance, the instruction words specifying the sequence of vector transfer to the digital signal processor 18 will contain the appropriate repeat and increment codes enabling the storage controller to transfer the vector of data out of the bulk memory to the digital signal processor 18 in the desired format. For example, time-dependent data from a number of different sources may be transferred from the DAU 14 into consecutive address locations in the bulk memory 200. Additional time-dependent data from each source for consecutive time intervals are then stored in consecutive address locations. In order to process only the data from a particular source, a so-called "memory corner turn" must be performed. The repeat and increment capabilities of the storage controller 20 enable it to efficiently form a new vector comprised of the data words from only one particular source. This capability greatly increases the processing capabilities of the digital signal processing system, since the desired vector of data words is generated by the storage controller 20 in a form that is readily usable by the digital signal processor 18. Furthermore, this vector of data can be formed by the storage controller 20 at the same time that the digital signal processor 18 is processing other data which increases the data throughput of the digital signal processing system since the signal processor 18 does not have to handle the time-consuming task of initially storing the data from the external sources and performing the "memory corner turn" in order to process the data from only one particular source.

During the execution of a portion of the program associated with a particular port, a port having a higher priority than the one presently being executed may request a data transfer. In this case, the port select logic 146 of the storage controller 20, shown in FIGS. 3 and 9, will recognize the request from the higher priority port, interrupt the execution of the present program and cause the program memory address generator 60 to generate the first address of the program associated with the higher priority port. when the vector transfer with the higher priority port has been completed, the storage controller 20 will resume execution of the program of the previously interrupted port in a normal manner.

Figure 13:
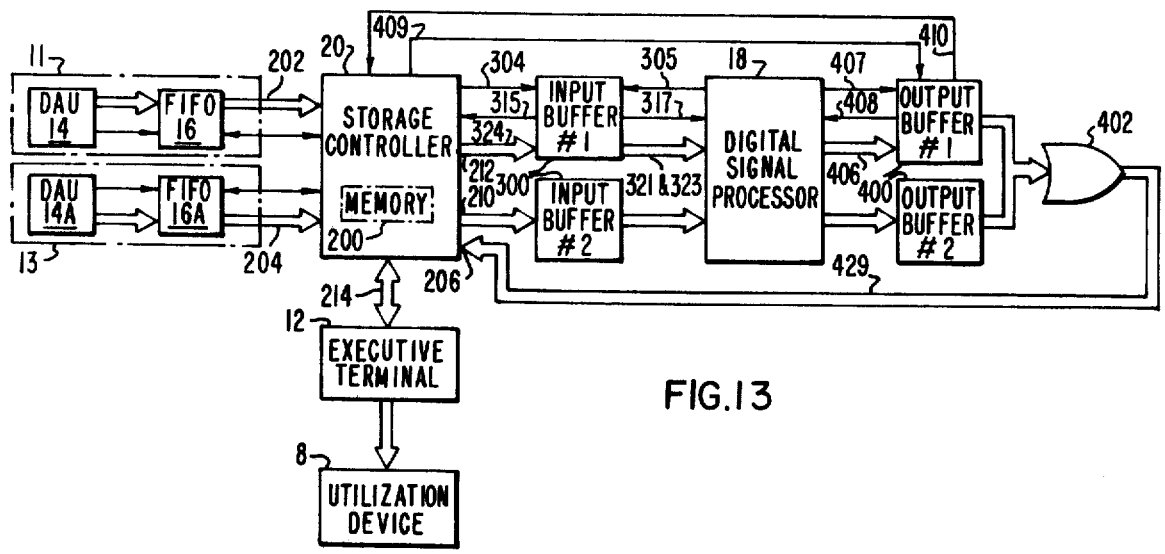
FIG. 13 is a block diagram of another embodiment of a digital signal processing system.

Another embodiment of this invention is shown in FIG. 13, wherein input buffers 300 and output buffers 400 interface the transfer of a vector of data words between the storage controller 20 and the digital signal processor 18. These buffers provide temporary storage for a vector of data words thus enabling both the storage controller 20 and digital signal processor 18 to proceed at their own individual cycle rate which maximizes overall system throughput since the transfer of the vector of data words into and out of the buffers can proceed at a higher rate than would be the case if the vector of data words was transferred directly between the storage controller 20 and the signal processor 18. The use of two input buffers 300 and two output buffers 400, as shown in FIG. 13, enable each input buffer and each output buffer to be operable independently from its corresponding buffer thus enabling, for example, input buffer #1 to be loaded with a vector of data words from the storage controller 20 at the same time that a vector of data words is being transferred from input buffer #2 into the digital signal processor 18. Although two input buffers 300 and two output buffers 400 are shown, it is understood that any number of buffers may be utilized without departing from the scope of this invention. Furthermore, since the construction of input buffers 300, #1 and #2, and the construction of output buffers 400, #1 and 190 2, are identical, only input buffer 300 #1 and output buffer 400 #1 will be described in detail hereafter.

Figure 14:
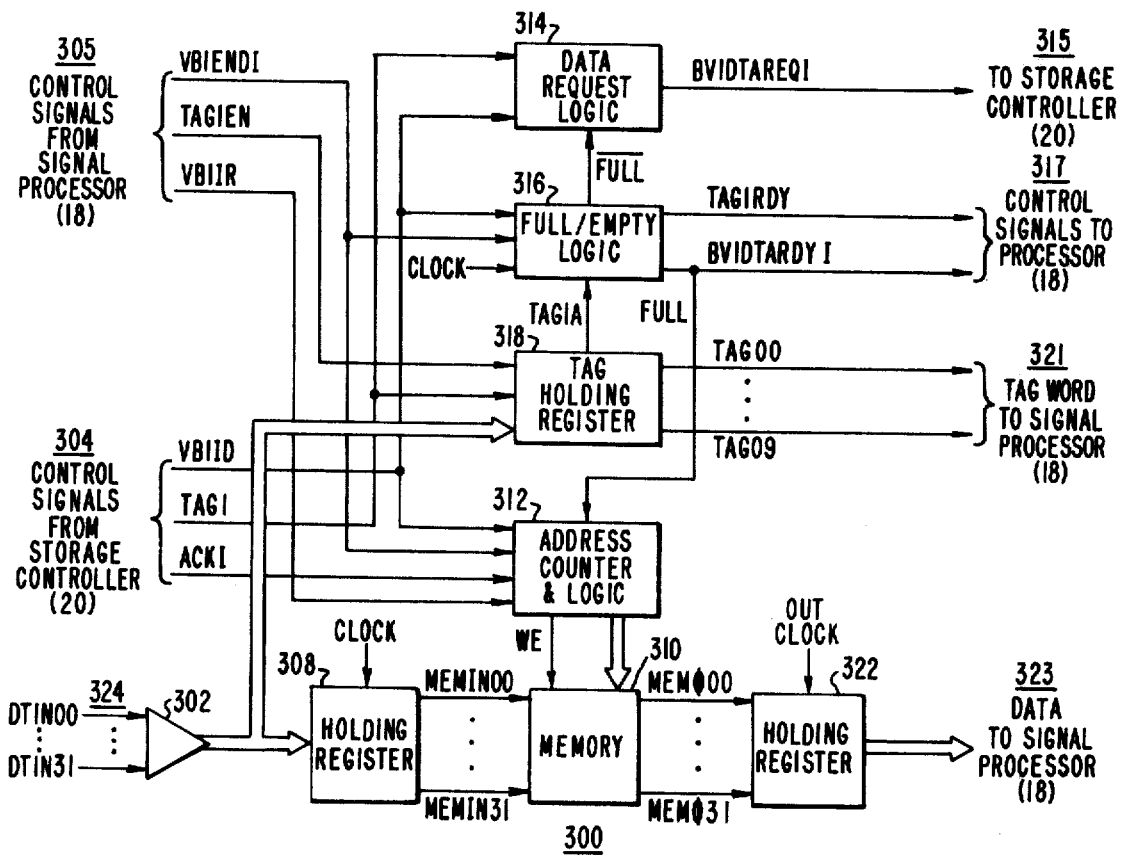
FIG. 14 is a block diagram of the input buffer shown in FIG. 13.

A detailed block diagram of input buffer 300 is shown in FIG. 14. Basically, input buffer 190 1, indicated by reference numeral 300, includes a memory 310, wherein a vector of data words transferred from the storage controller 20 to the digital signal processor 18, is temporarily stored and assorted logic circuitry utilized to control the transfer of the vector into and out of the input buffer 300. As described previously, a vector of data words is generated by the storage controller 20 and transferred to input buffer 300 on data bus 324 which, according to the preferred embodiment of this invention, consists of 32 lines, each carrying a logic level signal indicative of a particular bit of the 32-bit data word. Each data word of the vector of data words to be transferred is carried along data bus 324 to an individual differential receiver, generally indicated by reference number 302, and are in turn gated into holding register 308 which stores the 32-bit data word for loading into memory 310 under the control of the logic circuitry of the input buffer 300.

The storage controller 20 contains certain constants which indicate which program or algorithm is to be performed by the digital signal processor 18 on the vector of data words transferred between the storage controller 20 and the digital signal processor 18. These constants or tags are transferred along with the vector of data words to the input buffer 300. Accordingly, storage controller 20 will generate a TAG1 signal which indicates that the first data word of the vector of data words contains a constant specifying a particular program or computation to be performed by the digital signal processor 18. The TAG1 signal is high or enabled only for the length of time required to load the first data word of the vector into the tag holding register 318.

Figure 15:
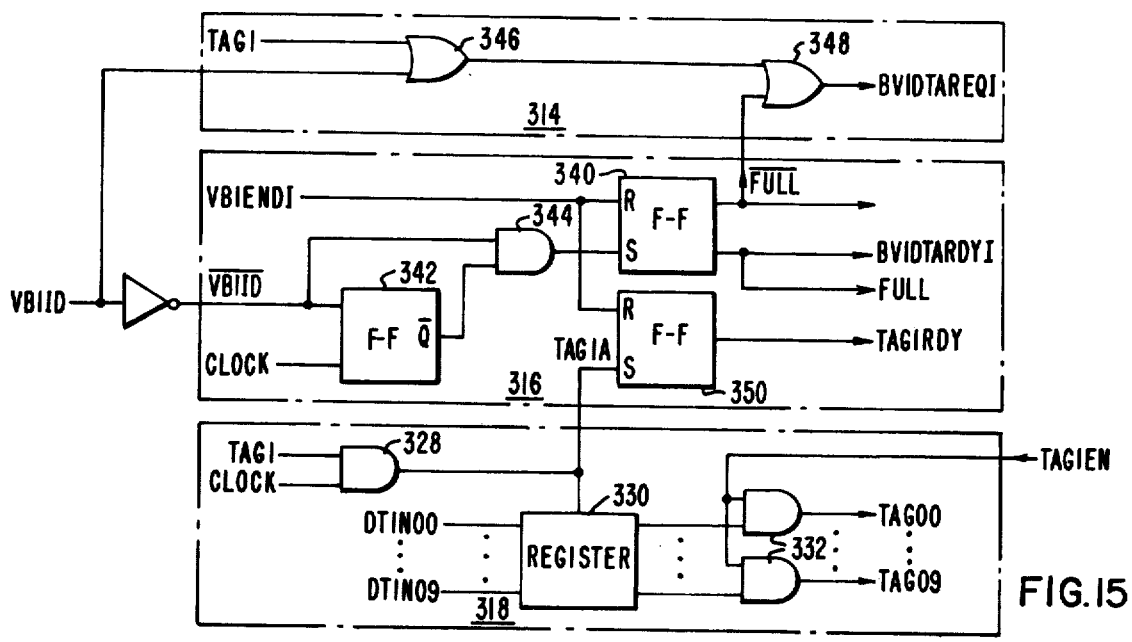
FIG. 15 is a detailed block diagram of the data request, full/empty and tag holding register logic circuitry of the input buffer shown in FIG. 14.

FIG. 15 illustrates, in part, the detailed construction of the tag holding register circuitry 318 shown generally in FIG. 14. In operation, the TAG1 signal enables a clock through AND gate 328 which in turn clocks the 10-bit tag word, designated by signals DTIN00 through DTIN09 into register 330. Register 330 will store the tag word until a TAG1EN signal is received from the signal processor 18; whereon the tag word is read out of the register 330 through AND gates 332 and transferred to the signal processor 18.

Referring again to FIG. 14, the address counter and logic circuitry 312 shown therein provides the necessary addresses and control signals needed to store each data word of the vector of data words in the memory 310. As shown in greater detail in FIG. 16, address counter and logic circuitry 312 consists of address counters 334 and associated circuitry which enables or resets the address counters 334 at the appropriate time during the transfer of a vector of data words into or out of input buffer 300. The address counters 334 will generate a 10-bit address, labeled ADB00 through ADB09 which is sufficient to address each word of the 1K of words in memory 310. According to the preferred embodiment of this invention, the memory 310 contains 1K of 32-bit words implemented in 32 memory chips each containing 1,024 bits. Each memory chip, such as memory chip 336, is addressed by the address lines ADB00 through ADB09 from the address counters 334, thus enabling the state of each bit of a data word held in holding register 308, such as the bit indicated by the signal MEMIN00 to be stored in memory chip 336 at the address specified by the address counters 334 under the control of the write enable (WE) signals. After transferring a data word, the address counters 334 will be incremented by one, thus enabling the next data word of the vector to be stored in the next sequential address location in each of the memory chips in memory 310. During the outputting of a vector of data words input buffer 300 to the digital signal processor 18, the address counters 334 will generate an address which will enable the state of the bit specified by the address generated by address counters 334 on each memory chip in memory 310 to be read out on a series of data lines labeled MEM$\phi$00 through MEM$\phi$31 and stored in holding register 322. Each data word stored in holding register 322 is sent to the signal processor 18 on data bus 323 at the appropriate time under the control of a clock signal.

The control signals needed to control the transfer of a vector of data words into and out of the input buffer 300 are contained in a data request logic 314 and the full/empty logic section 316 of input buffer 300 shown in FIGS. 14 and 15. Basically, input buffer 300 operates on a full/empty concept, that is, when the input buffer 300 is empty, the logic is waiting to receive input data from the storage controller 20; and when the input buffer 300 is full, the logic wants to send the vector of data to the digital signal processor 18. The indication of whether the input buffer 300 is empty or full is obtained from flip-flop 340 of the full/empty logic section 316, shown in greater detail in FIG. 15. Flip-flop 340 will be set to a "1" state, indicating that the input buffer 300 is full, at the completion of the transfer of a vector of data words from the storage controller 20. Upon transferring the vector, storage controller 20 will generate a signal labeled VB1ID which is high throughout the transfer of the vector from the storage controller 20 to the input buffer 300. Upon completion of the transfer of the vector, signal VB1ID will go low. Flip-flop 342 and AND gate 344 store the sequence of control signal VB1ID and generate a signal which sets flip-flop 340 to the "1" state when signal VB1ID goes low. Flip-flop 340, on the other hand, is set to a "0" or empty state by control signal VB1ENDI which is received from the digital signal processor 18 upon the completion of a transfer of a complete vector of data words from input buffer 300 to the signal processor 18.

The output state of flip-flop 340 is used to set a flag in the storage controller 20 which, during the execution of its program, is checking for the presence of the flag associated with input buffer 300 in order to initiate the transfer of a vector of data words to the input buffer 300. When flip-flop 340 is empty or in the "0" state, the flag will be set to a "1". Upon sensing this flag to be in the "1" state, storage controller 20 will generate the VB1ID signal which is OR'ed with the TAG1 signal, described above, in OR gate 346 of the data request logic 314. The output of OR gate 346 is OR'ed in OR gate 348 with the FULL state of flip-flop 340 to generate a request signal BV1DTAREQI which indicates to the storage controller 20 that input buffer 300 is requesting a transfer of a vector of data words. Likewise, the FULL or "1" state of flip-flop 340 is used to generate a signal labeled BV1DTARDYI which is sent to the digital signal processor 18 indicating that a full vector of data words is available for transfer from input buffer 300 to the signal processor 18. As mentioned previously, the storage controller 20 can send data specifying which program is to be performed by the signal processor 18. The TAG1 signal, indicating the presence of a tag word, sets flip-flop 350 in the full/empty logic 316, the output of which is a control signal TAG1RDY which indicates to the signal processor 18 that a tag word will follow. It should be noted that certain applications require the signal processor 18 to perform only one type of computation on a vector of data words. In such instances no tag word will be generated by the storage controller 20.

Referring again to FIG. 16, the use of the aforementioned control signals from the digital signal processor 18 and the storage controller 20 in controlling the mode of operation of the address counters 334 will now be described. Upon receiving the BV1DTAREQI signal from the input buffer 300, the storage controller 20 will generate an ACKI signal acknowledging the data request and begin to transfer a vector of data words to the input buffer 300. The ACKI and VB1ID signals from the storage controller 20 are AND'ed together in AND gate 352, the output of which through OR gate 354 generates a control signal enabling each address counter 334 to count at the rate of clock signal 362 and thereby generate a new address location in memory 310 for each data word of the vector of data words being transferred. Similarly, the digital signal processor 18 will acknowledge a BV1DTARDYI signal from input buffer 300 by generating a control signal VB1IR which is AND'ed in AND gate 356 with the FULL output of flip-flop 340 of the full/empty logic circuitry 316; the output of which is OR'ed together with the aforementioned signal from AND gate 352 in OR gate 354 to enable the address counters 334 for an output to the signal processor 18.

Upon completion of a transfer of a vector of data words into or out of the input buffer 300, the address counters 334 are reset to zero. The circuitry required to reset the address counters 334 includes AND gate 358 and OR gate 360. As described above, the VB1ID signal from the storage controller 20 will go low upon the transfer of a complete vector of data to the input buffer 300. This signal is AND'ed together with the FULL output signal from flip-flop 340 in AND gate 358. Similarly, the digital signal processor 18 will generate a signal VB1ENDI indicative of the transfer of a complete vector of data words from input buffer 300 to the signal processor 18. The VB1ENDI signal along with the output of AND gate 358 are OR'ed together in OR gate 360, the output of which generates the reset signal which resets the address counters 334 to zero.

Figure 16:
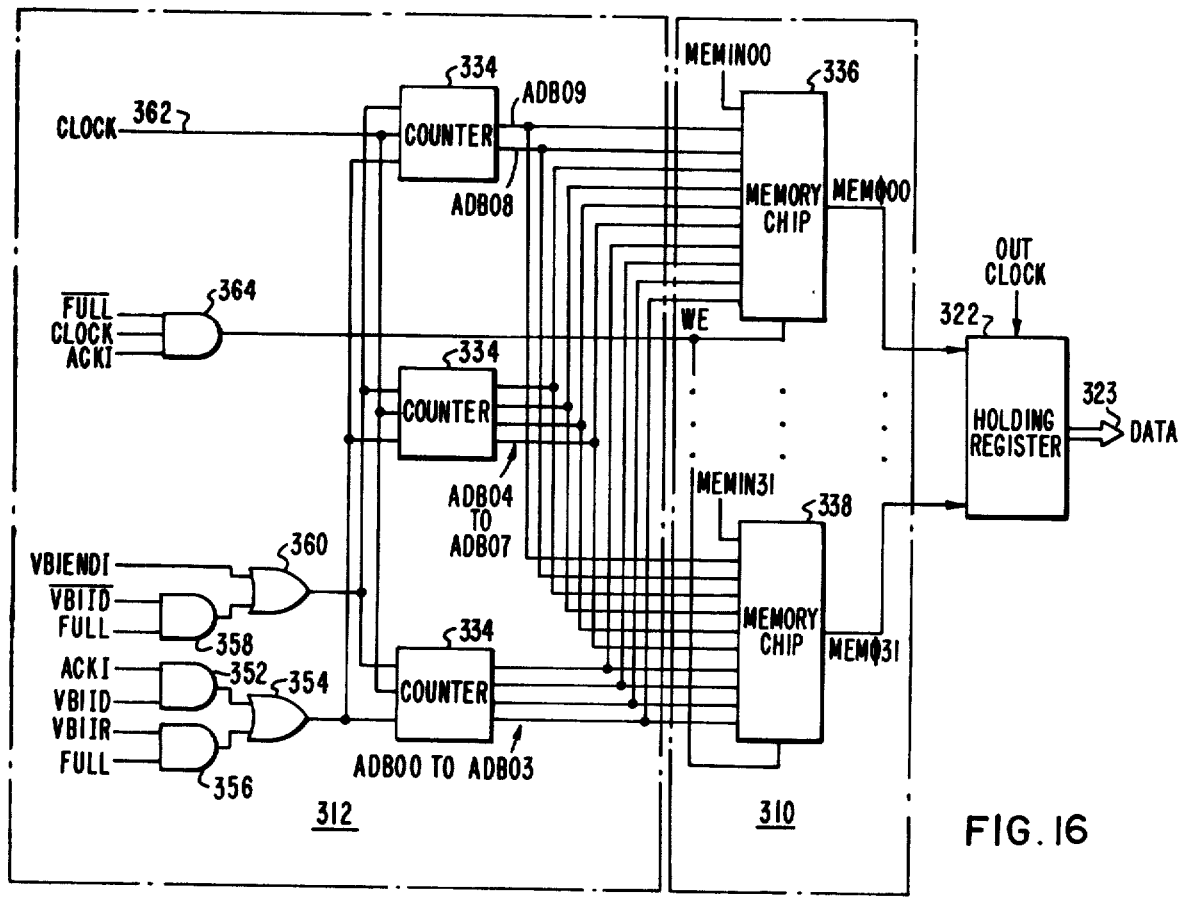
FIG. 16 is a detailed block diagram of the address counter and logic circuitry of the input buffer of FIG. 14.

FIG. 16 also depicts in detail the write enable (WE) signals utilized to control the writing of data into each memory chip in memory 310. The write enable signal (WE) for memory chip 336 is generated by AND gate 364 which has as its inputs the FULL output of flip-flop 340 of the full/empty logic section 316, a clock signal and the ACKI signal from the storage controller 20, thus enabling the data word stored in holding register 308, shown in FIG. 14, to be written into the memory chips of memory 310.

The actual operation of the input buffer during the transfer of a vector of data words from the storage controller 20 to the input buffer 300 proceeds as follows. Initially, flip-flop 340 in the full/empty logic section 316 of the input buffer 300 is in the "0" state indicating that memory 310 is empty. During the execution of its program, the storage controller 20 will check to see if flip-flop 340 is in the "0" state. When this occurs, the storage controller 20 generates a VB1ID signal which is sent to the full/empty logic section 316 of input buffer 300 and in turn a BV1DTAREQI signal is sent back to the storage controller 20 requesting a transfer of a vector of data words. Storage controller 20, upon acknowledging this request for data, will generate an ACKI signal which starts the transfer of a vector of data words from the storage controller 20 to the memory 310 of the input buffer 300. During this transfer, the address counters 334 generate incremental address locations in the memory 310 whereby each data word of the vector of data words is transferred from the storage controller 20 through the holding register 308 into the specified address location in memory 310. When a complete vector of data words has been transferred, the VB1ID signal goes low which sets the flip-flop 340 to the full or "1" state and also resets the address counters to zero.

In transferring a vector of data words from the input buffer 300 to the digital signal processor 18, the full/empty flip-flop 340, when in the full or "1" state, will generate a BV1DTARDYI signal indicating to the signal processor 18 that a full vector of data words is available for transfer. The signal processor acknowledges this data ready signal by generating a signal, labeled VB1IR, which in conjunction with the full signal, enables the address counters 334 to begin generating incremental address locations in memory 310, starting at address location zero, whereby the vector of data words stored at these address locations is transferred from memory 310 through holding register 322 to the signal processor 18. When a complete vector has been transferred to the signal processor 18, the processor 18 issues a VB1ENDI signal indicating the completion of the vector transfer. This signal resets the address counters 334 and full/empty flip-flip 340 to "0".

Figure 17:
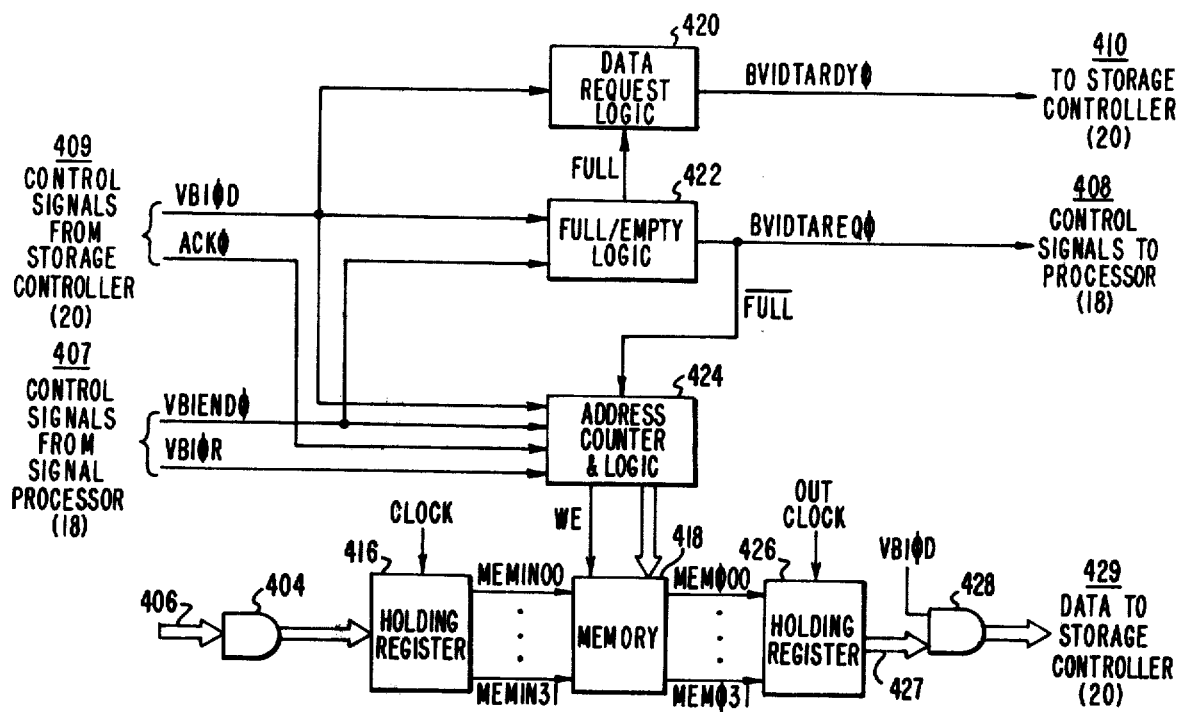
FIG. 17 is a block diagram of the output buffer shown in FIG. 13.

As shown in FIG. 13, two output buffers 400 interface the digital signal processor 18 with the storage controller 20 for the transfer of a vector of data words from the signal processor 18 to the storage controller 20. The outputs of the two output buffers 400, #1 and #2, are OR'ed together in a series of OR gates 402 which provide the 32-bit data word utilized in the storage controller 20. Referring to FIG. 17, there is shown a block diagram of an output buffer 400 constructed according to the teachings of this invention. The vector of data words to be transferred between the signal processor 18 and the output buffer 400 is carried on data bus 406 and consists of individual 32-bit words. Each bit of the data word is received by a series of drivers 404 and gated into holding register 416 which temporarily holds each 32-bit data word until an address is generated for it to be stored in memory 418. A 1K, 32-bit RAM memory 418 is utilized in the preferred embodiment of this invention. Each data word of the vector words that is transferred into and out of memory 418 is stored in sequential address locations that are generated by the address counter and logic circuitry 424. As in the input buffer 300, the memory 418 includes 32 1K memory chips, such as chips 432 and 434 shown in FIG. 18, each of which stores one bit of the 32-bit data word that is transferred into or out of the output buffer 400. Each bit of the data word is read out of memory 418 on data lines MEM$\phi$00 through MEM$\phi$31 and is fed into holding register 426 which, in turn, clocks the data word onto the output bus 429 to the storage controller 20. Each bit of the data word from holding register 426 on bus 427 is fed into an individual AND gate, indicated generally by reference numeral 428, which also has as its input, signal VB1$\phi$D, which is issued by the storage controller 20 and acts as an enable to transfer the data word from the output buffer 400 onto data bus 429 to the storage controller 20.

Figure 19:
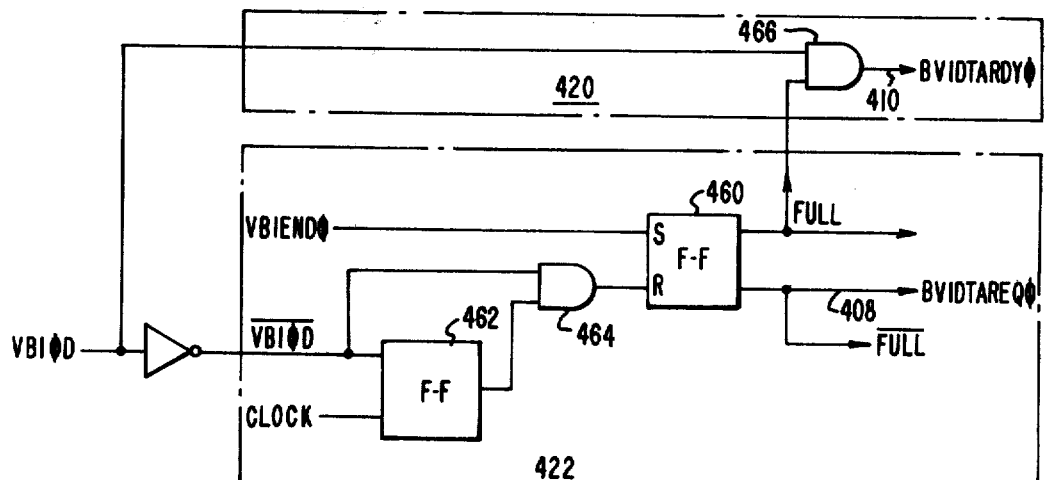
FIG. 19 is a detailed block diagram of the data request and full/empty logic circuitry of the output buffer of FIG. 17.

The data request logic 420 and the full/empty logic circuitry 422, used to control the transfer of a vector of data words into and out of output buffer 400, are shown in greater detail in FIG. 19. The full/empty logic circuitry 422 contains the necessary logic to determine if the memory 418 of output buffer 400 contains a full vector of data words. The full or empty state of the output buffer 400 is indicated by the full/empty flip-flop 460. Flip-flop 460 is set, indicating the full state of the memory 418 of the output buffer 400, by signal VB1END$\phi$ which is generated by the digital signal processor 18 at the completion of a transfer of vector words from the signal processor 18 to the output buffer 400. The full/empty flip-flop 460 is reset to a "0" or empty state, by a signal from flip-flop 642 and AND gate 464. This reset signal is generated whenever the VB1$\phi$D signal, which is high during a transfer of a vector of data words between the output buffer 400 and the storage controller 20, has gone to a low state indicating the completion of the transfer of a vector. The empty or not full output of flip-flop 460 generates a control signal BV1DTAREQ$\phi$ which requests data from the signal processor 18.

The data request logic 420, shown in FIG. 19, is utilized to indicate to the storage controller 20 that a full vector of data words is available for transfer from the output buffer 400. Whenever the full/empty flip-flop 460 is in the "1" or full state, a flag will be set which will be checked by the storage controller 20. Upon sensing the flag to be set, the storage controller 20 will generate a control signal VB1$\phi$D which is OR'ed with the FULL signal from the flip-flop 460 in OR gate 466 and thereby generate a data ready signal BV1DTARDY$\phi$ which is in turn sent to the storage controller 20 indicating that the output buffer 400 is ready to transfer a vector of data words to the storage controller 20.

Figure 18:
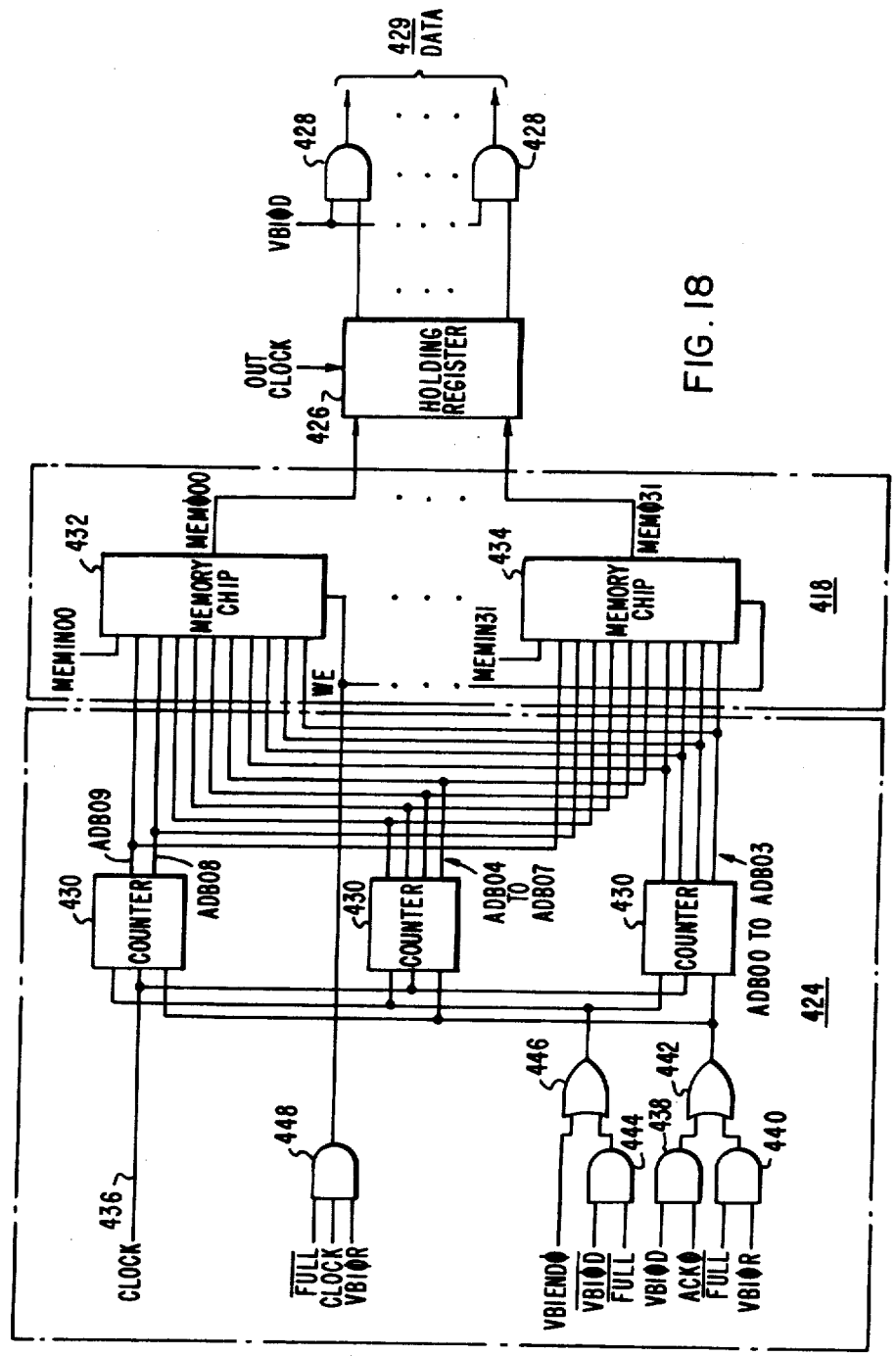
FIG. 18 is a detailed block diagram of address counter and logic circuitry of the output buffer of FIG. 17.

Referring again to FIG. 18, the construction and operation of the address counter and logic circuitry 424 will now be described in detail. The address counters 430 are used to generate the 10-bit address needed to address each word of the 1K words stored in memory 418. The address counters 430 are designed to generate incremental addresses for the memory 418 under the control of logic circuitry which either enables the address counter clock 436 to increment the counters 430 or resets the address counters 430 to zero. As seen in FIG. 18, OR gate 442 has, as one of its inputs, the output of AND gate 438 which combines the VB1$\phi$D signal, indicating a transfer of data from the output buffer 400 to the storage controller 20, with the ACK$\phi$ signal which indicates that the storage controller 20 has acknowledged a request for a transfer of data from the output buffer 400. The other input of OR gate 442 is from AND gate 440 which combines the not full ($\overline{\text{FULL}}$) output of flip-flop 460 of the full/empty logic circuitry 422 with control signal VB1$\phi$R generated by the signal processor 18 to indicate a transfer of a vector of data words to the output buffer 400. Whenever the output of OR gate 442 goes high, the clock signal 436 is enabled which begins to increment the address counters 430 and generate the addresses required for memory 418. In order to properly store and read out a vector of data words in memory 418, the address counters 430 must be reset to zero upon the completion of a transfer of data words into or out of output buffer 400. This is accomplished by a signal generated by the output of OR gate 446 which has as one of its inputs, control signal VB1END$\phi$, which is issued by the signal processor 18 upon completion of a transfer of a vector of data words from the signal processor 18 to the output buffer 400. OR gate 446 has as its other input the output of AND gate 444 which combines the not or absence of control signal VB1$\phi$D, which goes low upon completion of a transfer of a vector of data words from the output buffer 400 to the storage controller 20, with the not full ($\overline{\text{FULL}}$) output of full/empty flip-flop 460.

FIG. 18 also illustrates the control signals utilized to control the writing of data into each memory chip of memory 418. Each memory chip, such as memory chip 432 of memory 418, receives a write enable (WE) signal which writes or stores the information contained on the input to the memory chip 432 at the address location specified by the address counters 430. The write enable (WE) signal for memory chip 432, for example, is generated by AND gate 448 which has as its inputs, control signal VB1φR, generated by the signal processor 18 to transfer a vector of data words to the output buffer 400, the not full ($\overline{FULL}$) output of full/empty flip-flop 460 and a clock pulse which generates the write enable signal at the appropriate time during the transfer of the data word.

In the operation of the output buffer 400, the full-/empty flip-flop 460 will initially be in the empty state which will generate a control signal BV1DTAREQφ requesting data from the signal processor 18. The signal processor 18 will then generate a control signal VB1φR which enables the address counters 430 and begins the transfer of data words from the signal processor 18 to the memory 418 of the output buffer 400. When a complete vector of data words has been transferred, the signal processor 18 sends a control signal VB1ENDφ to the full/empty flip-flop 460 which sets flip-flop 460 to the full state. This will set a flag which will be checked by the storage controller 20 during the execution of its control program. Upon recognizing the flag to be in the proper state, the storage controller 20 will generate a control signal VB1φD which is sent to the output buffer 400. Upon coincidence of the control signal VB1φD and the full signal from flip-flop 460, OR gate 466 will generate a data ready signal BV1DTARDYφ which is sent to the storage controller 20. The storage controller 20 will acknowledge this request for data by generating control signal ACKφ which enables the address counters 430 of the output buffer 400 and begins the transfer of the vector of data words from the memory 418 of output buffer 400 to the storage controller 20 on data bus 429. Upon completion of the transfer of a complete vector of data words to the storage controller 20, control signal VB1φD will go low causing the full/empty flip-flop 460 to be reset to a "0" or empty state and also resetting the address counters 430 to "0".

It will be apparent to one skilled in the art that there has been disclosed a novel storage controller which greatly improves the processing capability of a digital signal processing system. This storage controller initiates and controls the transfer of vectors of data words between a bulk memory and either input devices or a digital signal processor, thereby relieving the digital signal processor of the time consuming task of controlling such data transfers. Furthermore, the storage controller has the unique capability of generating the addresses required for a vector transfer into and out of the bulk memory, wherein each address may be a predetermined increment from the preceding address; which is especially useful in generating a vector of data in the form required to efficiently perform certain complex arithmetic functions, such as a Fast Fourier Transform. In addition, the storage controller, under program control, may repeat the execution of an individual program instruction word a predetermined number of times and generate a new memory address on each repeated execution, which increases the processing capability of the storage controller since the memory need not be accessed in order to fetch the instruction word required to generate each successive address required for a transfer of a vector of data words as is necessary in prior art controllers.

What is claimed is:

1. A storage controller for controlling the transfer of vectors of digital data words between a data terminal and a first memory in said storage controller comprising:

said first memory having a plurality of addressable locations for storing digital data words transferable between said data terminal and said first memory;

means for initiating a transfer of a vector of data words between said data terminal and said first memory;

first storage means for storing predetermined constants used to control the transfer of said vector of data words;

means for selecting said predetermined constants from said first storage means in response to said initiating means and from predetermined constants previously selected;

first memory address generating means, responsive to said selected predetermined constants for generating addresses for said first memory; and means for generating control signals responsive to said selected predetermined constants for transferring each data word of said vector of data words between said generated address locations in said first memory and said data terminal.

2. The storage controller of claim 1 wherein the first memory address generating means includes means responsive to said predetermined constants for incrementing a previously generated address by a predetermined number in order to generate a new address specifying a location in the first memory.

3. The storage controller of claim 2 wherein the incrementing means includes:

second storage means for storing said previously generated address used in transferring a data word of the vector of data words between the data terminal and said first memory; and adder means, responsive to the predetermined constants, for adding the predetermined number specifying an address increment to said last address in order to generate the address to be used in transferring the next data word of said vector of data words between said data terminal and said first memory.

4. The storage controller of claim 1 wherein the first storage means includes a second memory having a plurality of addressable locations, for storing digital said predetermined constants and wherein the selecting means includes a second memory address generating means for generating addresses for said second memory that are used in fetching said predetermined constants from said second memory means.

5. The storage controller of claim 4 wherein said control signals have a time sequence for transferring each word of said vector of data words, said means for generating control signals includes repeating means for repeating said time sequence of said control signals in response to certain of said predetermined constants a predetermined number of times in order to transfer a plurality of data words of a vector, and said second memory address generating means being responsive to said repeating means for fetching additional predetermined constants from said second memory to be used in transferring a vector of data words between the data terminal and said first memory when the predetermined number of executions of said certain of said predetermined constants have been completed.

6. The storage controller of claim 5 wherein the repeating means includes:

at least certain of the predetermined constants specifying the number of times said time sequence of said control signals is to be performed;

second storage means for storing the number of times said time sequence of said control signals has been performed; and comparator means for comparing said number specified by said predetermined constants with the number stored in said second storage means to generate a signal when said numbers agree, said second memory address generating means being responsive to said signal for fetching additional predetermined constants from the second memory.

7. The storage controller of claim 1 further including a plurality of data terminals and wherein said means for initiating a transfer of a vector of data words includes means, associated with each of said data terminals, for requesting a vector transfer with the first memory.

8. The storage controller of claim 7 wherein at least one of the data terminals includes a digital signal processor having at least a second memory, control means responsive to predetermined constants stored in said second memory for controlling said digital signal processor and an arithmetic unit for performing arithmetic operations on vectors of digital data words.

9. The storage controller of claim 7 wherein the means for initiating a vector transfer further includes each of said data terminals having a preassigned priority and further including priority means, responsive to the requesting means and to said preassigned priorities of each of said data terminals, for determining which of said data terminals requesting a vector transfer with the first memory has the highest priority.

10. The storage controller of claim 9 further including interrupt means, responsive to said priority means, for interrupting the fetching and executing of the predetermined constants used in transferring a vector of data words between a first data terminal of said plurality of terminals and the first memory when a second data terminal of said plurality of terminals having a higher priority than said first data terminal requests a data transfer with said first memory, with the first memory address generating means being responsive to said interrupt means for fetching said predetermined constants associated with said requesting data terminal having the higher priority, said interrupt means further including second storage means for storing the address in the first storage means associated with said predetermined constant executed immediately prior to the interrupt, said executing of the predetermined constants includes the generation of control signals by said means for generating control signals in response to said predetermined constants.

11. A method for controlling the transfer of vectors of digital data words between a plurality of data terminals and a first memory having a plurality of addressable locations for storing digital data words comprising the steps of:

selecting one of said data terminals for a vector transfer of data words with said first memory;

storing in a first storage means predetermined constants used to control the transfer of a vector of data words between each of said data terminals and said first memory;

initiating a transfer of a vector of data words between said selected data terminal and said first memory;

selecting said predetermined constants from said first storage means in response to said step of initiating and selecting additional predetermined constants in response to previously selected predetermined constants;

generating addresses for said first memory in response to selected predetermined constants;

generating control signals responsive to said selected predetermined constants for transferring each data word of said vector of data words between said generated address locations in said first memory and said selected data terminal.

12. The method of claim 11 wherein said step of generating addresses includes the step of incrementing a previously generated address by a sequence of predetermined numbers in order to obtain a sequence of addresses and wherein said predetermined numbers are varied in said sequence such that a series of address locations in said first memory is generated, certain of which addresses are non-sequential increments from said preceding addresses.

13. The method of claim 11 wherein the predetermined constants are provided in a second memory having a plurality of addressable locations and including the steps of generating addresses for said second memory and fetching said predetermined constants stored at said generated addresses in said second memory.

14. The method of claim 11 further including the steps of:

assigning priorities to each of said data terminals specifying the order of vector transfer of data words between each said data terminals and the first memory;

requesting a vector transfer by each of said data terminals with said first memory when each of said data terminals is in the proper state for a vector transfer;

selecting the data terminal of the number of data terminals requesting a vector transfer with said first memory that has the highest assigned priority.

15. The method of claim 14 including the step of interrupting the transfer of a vector of data words between one of the data terminals and the first memory when another one of said data terminals, having a higher priority than said data terminal presently transferring a vector of data words with said first memory, requests a vector transfer of data words with said first memory.

* * * * *